(12) United States Patent
El Essaili et al.

(10) Patent No.: US 12,133,143 B2
(45) Date of Patent: *Oct. 29, 2024

(54) GEOGRAPHICAL AREA MESSAGE DISTRIBUTION

(71) Applicant: Telefonaktiebolaget LM Ericsson (publ), Stockholm (SE)

(72) Inventors: Ali El Essaili, Aachen (DE); Yunpeng Zang, Würselen (DE); Thorsten Lohmar, Herzogenrath (DE); Maciej Muehleisen, Eynatten (BE); Joakim Åkesson, Landvetter (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,791

(22) Filed: Dec. 28, 2022

(65) Prior Publication Data

US 2023/0164520 A1    May 25, 2023

Related U.S. Application Data

(63) Continuation of application No. 17/290,884, filed as application No. PCT/EP2019/081709 on Nov. 19, 2019, now Pat. No. 11,570,582.

(Continued)

(51) Int. Cl.
*H04W 4/40*      (2018.01)
*H04W 4/029*     (2018.01)

(52) U.S. Cl.
CPC .............. *H04W 4/029* (2018.02); *H04W 4/40* (2018.02)

(58) Field of Classification Search
CPC ....... H04W 4/029; H04W 4/40; H04W 4/021; H04W 4/06; H04W 4/44; H04W 88/184
See application file for complete search history.

(56) References Cited

U.S. PATENT DOCUMENTS 11,570,582 B2 *   1/2023   El Essaili ............ H04W 4/021
2013/0311547 A1  11/2013   Foti
(Continued)

FOREIGN PATENT DOCUMENTS

| CN | 104412626 A | 3/2015 |
| KR | 20180004154 A | 1/2018 |
| WO | 2019064270 A1 | 4/2019 |

OTHER PUBLICATIONS

3GPP, "3GPP TS 23.286 V0.1.0", 3rd Generation Partnership Project; Technical Specification Group Services and System Aspects; Application layer support for V2X services; Functional architecture and information flows; (Release 16), Oct. 2018, 1-28.

(Continued)

*Primary Examiner* — Marcus Hammonds
(74) *Attorney, Agent, or Firm* — Murphy, Bilak & Homiller, PLLC

(57) ABSTRACT

A mobile device (10) subscribes to receive messages targeted to a first geographical area (18-A), e.g., a first tile or area of a grid for geocasting. The mobile device (10) also subscribes to receive messages targeted to a second geographical area (18-B), e.g., a second tile or area of the grid for geocasting. The mobile device (10) notably does this such that the mobile device (10) is simultaneously subscribed to receive messages targeted to the first geographical area (18-A) and to receive messages targeted to the second geographical area (18-B).

27 Claims, 28 Drawing Sheets

Related U.S. Application Data

(60) Provisional application No. 62/769,539, filed on Nov. 19, 2018.

(56) References Cited

U.S. PATENT DOCUMENTS

| | | |
|---|---|---|
| 2014/0235193 A1 | 8/2014 | Guo et al. |
| 2015/0189615 A1 | 7/2015 | Rembarz et al. |
| 2018/0049274 A1 | 2/2018 | Kim et al. |
| 2018/0176742 A1* | 6/2018 | Narayanan ....... G08G 1/096783 |
| 2018/0234800 A1* | 8/2018 | Ayaz ..................... H04W 4/44 |
| 2019/0150046 A1* | 5/2019 | Shiga ..................... H04W 4/48 |
| | | 370/331 |

OTHER PUBLICATIONS

3GPP, "3GPP TS 23.285 V16.1.0", 3rd Generation Partnership Project; Technical Specification Group Services and System Aspects; Architecture enhancements for V2X services (Release 16), Sep. 2019, 1-37.

3GPP, "3GPP TS 23.286 V16.1.0", 3rd Generation Partnership Project; Technical Specification Group Services and System Aspects; Application layer support for Vehicle-to-Everything (V2X) services; Functional architecture and information flows; (Release 16), Sep. 2019, 1-59.

3GPP, "ETSI TR 102 962 V1.1.1", Intelligent Transport Systems (ITS); Framework for Public Mobile Networks in Cooperative ITS (C-ITS) Technical Report, ETSI, Feb. 2012, 1-63.

Ericsson, "pCR to V2X application message distribution", 3GPP TSG-SA WG6 Meeting #27, S6-18xxxx, (revision of S6-18xxxx), West Palm Beach, FL, USA, Nov. 26-30, 2018, 1-2.

Ericsson, "pCR to V2X application message distribution", GPP TSG-SA WG6 Meeting #27, S6-181693, (revision of S6-18xxxx), West Palm Beach, FL, USA, Nov. 26-30, 2018, 1-2.

Passchier, Igor, et al., "Milestone 4 Common set of upgraded specifications for hybrid communication", Specifications for IF2 for hybrid communication version 2.1, InterCor, Jan. 17, 2019, 1-58.

Passchier, Igor, et al., "Milestone 4 Common set of upgraded specifications for hybrid communication", Specifications for IF2 for hybrid communication version 1.0, InterCor, Feb. 23, 2018, 1-53.

3GPP, "3GPP TR 23.795 V16.0.0", 3rd Generation Partnership Project; Technical Specification Group Services and System Aspects; Study on application layer support for V2X services; (Release 16), Sep. 2018, 1-77.

3GPP, "3GPP TS 23.285 V15.1.0", 3rd Generation Partnership Project; Technical Specification Group Services and System Aspects; Architecture enhancements for V2X services (Release 15), Jun. 2018, 1-36.

* cited by examiner

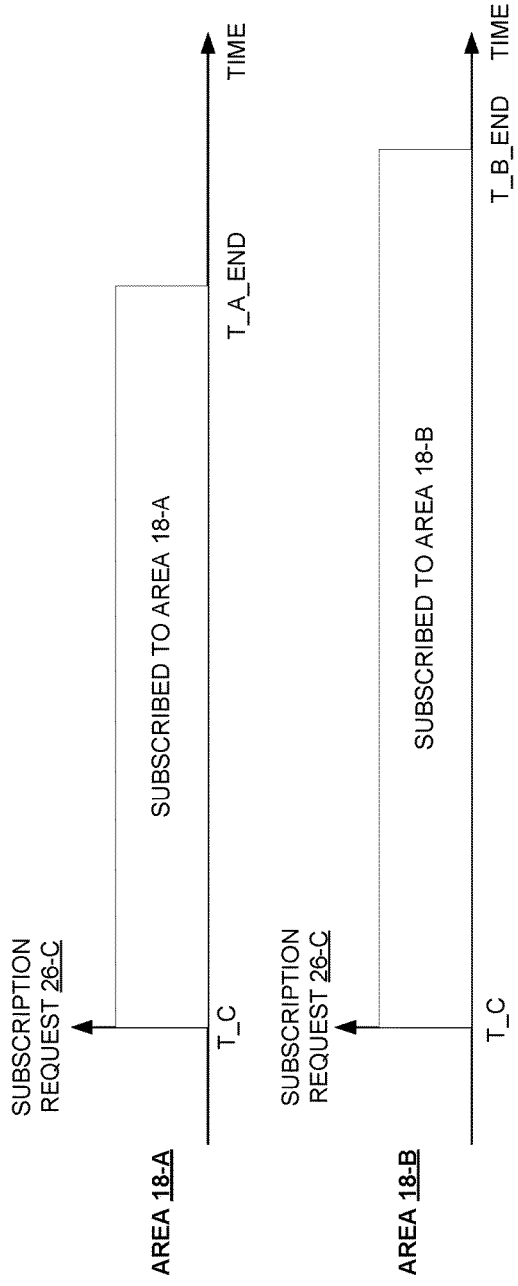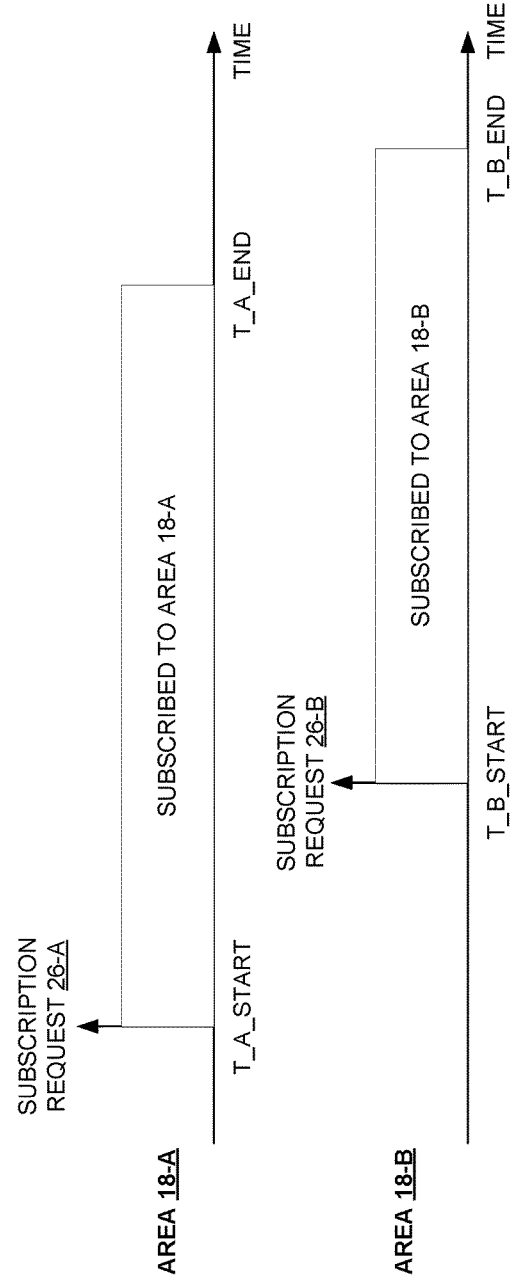
FIGURE 2A
FIGURE 2B

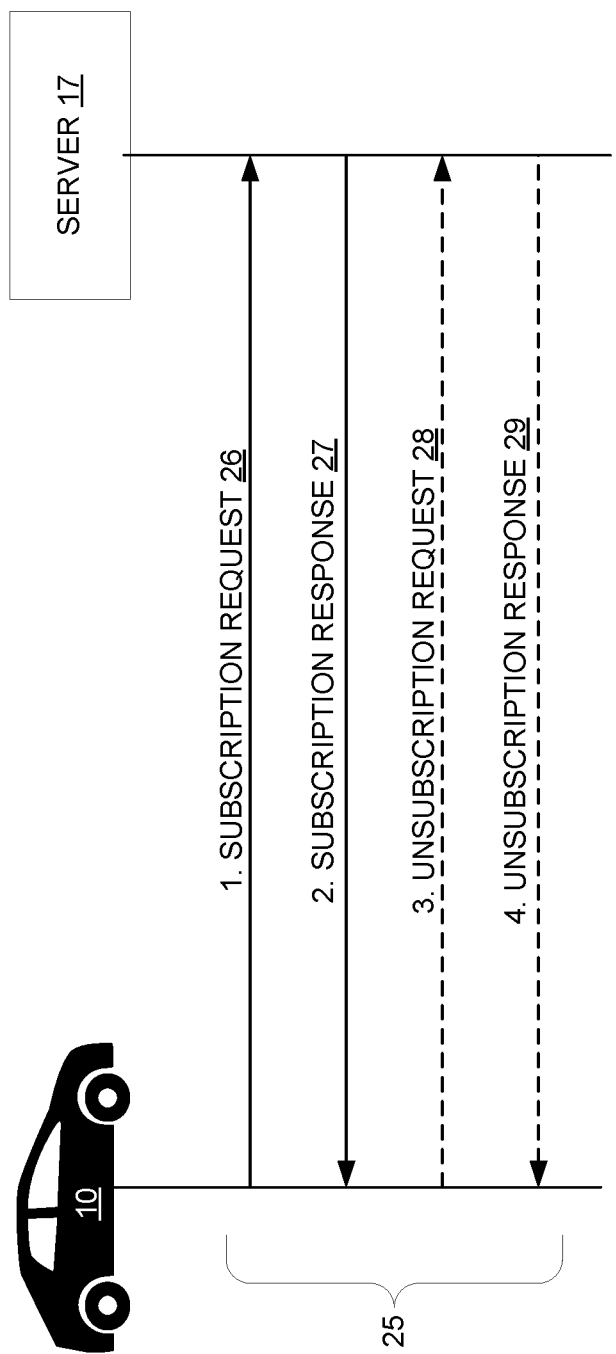

RECEIVING, FROM A MOBILE DEVICE, ONE OR MORE MESSAGES THAT ASSOCIATE THE MOBILE DEVICE WITH MULTIPLE GEOGRAPHICAL AREAS AT THE SAME TIME
700

FOR EACH OF THE GEOGRAPHICAL AREAS, TRANSMITTING ONE OR MORE MESSAGES TARGETED TO THAT GEOGRAPHICAL AREA
710

GEOGRAPHICAL AREA MESSAGE DISTRIBUTION

TECHNICAL FIELD

The present application relates generally to message distribution, and relates more particularly to geographical area message distribution.

BACKGROUND

Conventionally, the sender of a message targets a certain intended recipient to receive that message, e.g., where that intended recipient is identified by an Internet Protocol (IP) address. For geographical area message distribution, by contrast, the sender of a message targets a certain geographical area to receive the message. That is, the sender targets any recipients that are located in a certain geographical area, without necessarily knowing who might be the recipients. GeoCast for instance implements such geographical area message distribution by routing messages based on world coordinates or tiles/areas of a geographical grid, e.g., at an application-level on top of a traditional IP network.

Geographical area message distribution proves particularly useful for disseminating messages for an Intelligent Transportation System (ITS) or for vehicle-to-everything (V2X) communication, e.g., where messages may be disseminated to ITS/V2X users using long-range cellular unicast communication. ITS/V2X users report or subscribe to a geographical area in order to receive V2X/ITS messages for that target area. When moving from one geographical area to another, the ITS/V2X users report or subscribe to their new geographical area location to a server.

ITS messages are designed to enable ITS applications improving safety and traffic efficiency of road transport systems. Typical ITS messages include ETSI ITS cooperative aware message (CAM), decentralized environmental notification message (DENM), infrastructure-to-vehicle information message (IVIM), etc. Dissemination of ITS messages is based on the geographical location of ITS stations, i.e. only vehicular or personal ITS users in a specific geographic area, known as the target area, need to receive the message.

Although geographical area message distribution is useful in these or other contexts, distributing messages targeted to geographical areas proves suboptimal in a number of respects. For example, an ITS station will heretofore fail to receive a message targeted to the geographical area in which the ITS station is actually located if it is erroneously determined that the ITS station is located in a different geographical area. Moreover, due to positioning inaccuracy or other reasons, an ITS station moving from an old geographical area to a new geographical area may subscribe to that new geographical area late, resulting in undesirable service interruption.

SUMMARY

According to some embodiments herein, a mobile device is able to be subscribed to receive messages targeted to one geographical area, at the same time as being subscribed to receive messages targeted to another geographical area. That is, some embodiments enable the mobile device to be simultaneously subscribed to multiple geographical areas, i.e., to receive messages targeted to any of multiple geographical areas, even if the mobile device is not actually in one of those areas. Simultaneous subscription to multiple geographical areas may advantageously mitigate the effects of positioning inaccuracy or delayed subscription on message delivery. For example, the mobile device may simultaneously subscribe to multiple geographical areas within a zone of positioning uncertainty around the mobile device. This may ensure the mobile device receives messages targeted to the area within which the device is actually located, even in the presence of positioning inaccuracy. Alternatively or additionally, the mobile device may predict the next geographical area the device will be within after it leaves its current geographical area, and then proactively subscribe to receive messages targeted to the next geographical area without unsubscribing to receive messages targeted to its current geographical area. This may advantageously avoid service interruption that would occur if the mobile device were late in subscribing to the next geographical area it will be within.

More particularly, embodiments herein include a method performed by a mobile device. The method comprises subscribing to receive messages targeted to a first geographical area. The method also comprises subscribing to receive messages targeted to a second geographical area such that the mobile device is simultaneously subscribed to receive messages targeted to the first geographical area and to receive messages targeted to the second geographical area.

In some embodiments, subscribing to receive messages targeted to the second geographical area comprises, after subscribing to receive messages targeted to the first geographical area, subscribing to receive messages targeted to the second geographical area while remaining subscribed to receive messages targeted to the first geographical area. Alternatively or additionally, in some embodiments, subscribing to receive messages targeted to the second geographical area comprises, after subscribing to receive messages targeted to the first geographical area, subscribing to receive messages targeted to the second geographical area without unsubscribing from receiving messages targeted to the first geographical area.

In some embodiments, subscribing to receive messages targeted to the first geographical area comprises transmitting, to a server, a subscription request requesting that the mobile device be subscribed to receive messages targeted to the first geographical area, and wherein subscribing to receive messages targeted to the second geographical area comprises performing a procedure. In this case, performing the procedure comprises transmitting, to the server, as part of the procedure, another subscription request requesting that the mobile device be subscribed to receive messages targeted to the second geographical area. Performing the procedure also comprises refraining from transmitting, to the server, as part of the procedure, an unsubscription request requesting that the mobile device be unsubscribed from receiving messages targeted to the first geographical area.

In some embodiments, subscribing to receive messages targeted to the first geographical area and subscribing to receive messages targeted to the second geographical area comprises transmitting a single subscription request that requests both subscription of the mobile device to receive messages targeted to the first geographical area and subscription of the mobile device to receive messages targeted to the second geographical area.

In some embodiments, the messages targeted to the first geographical area and the messages targeted to the second geographical area are geocast messages that are geocast via a cellular network.

In some embodiments, the mobile device hosts a vehicle-to-everything, V2X, application enabler, VAE, client or hosts an intelligent transportation system, ITS, client. In this case, the messages targeted to the first geographical area and the messages targeted to the second geographical area are vehicle-to-everything, V2X, messages or intelligent transportation system, ITS, messages.

In some embodiments, the first and second geographical areas are each a tile or an area of a grid that is different from a coverage area of a cell provided by access network equipment.

In some embodiments, the second geographical area is a geographical area that the mobile device is predicted to be within after the first geographical area. In this case, the method may further comprise predicting, e.g., based on a trajectory of the mobile device, that the mobile device will be within the second geographical area after the first geographical area.

In some embodiments, the second geographical area is a geographical area that is adjacent to the first geographical area.

In some embodiments, the second geographical area is a geographical area within a zone of positioning uncertainty around the mobile device.

In some embodiments, the second geographical area is a geographical area that is included in a multi-area zone over which a service is provided.

In some embodiments, subscribing to receive messages targeted to the second geographical area is performed when the mobile device is not within the second geographical area.

In some embodiments, the mobile device is simultaneously subscribed to receive messages from both the first and the second geographical areas when moving between the first and second geographical areas.

In some embodiments, the method further comprises receiving one or more messages targeted to the first geographical area and one or more messages targeted to the second geographical area.

In some embodiments, the method further comprises receiving a message; and determining whether and/or how to process the received message based on to which of the first and the second geographical area the message is targeted and/or based on whether the message is for the service provided over the multi-area zone.

Embodiments herein also include a method performed by a server. The method comprises subscribing a mobile device to receive messages targeted to a first geographical area. The method also comprises subscribing the mobile device to receive messages targeted to a second geographical area such that the mobile device is simultaneously subscribed to receive messages targeted to the first geographical area and to receive messages targeted to the second geographical area.

In some embodiments, the method further comprises transmitting, to the mobile device, one or more messages that are targeted to the first geographical area and transmitting, to the mobile device, one or more messages that are targeted to the second geographical area. In some embodiments, such transmitting comprises geocasting the messages via a cellular network.

In some embodiments, subscribing the mobile device to receive messages targeted to the second geographical area comprises, after subscribing the mobile device to receive messages targeted to the first geographical area, subscribing the mobile device to receive messages targeted to the second geographical area while the mobile device remains subscribed to receive messages targeted to the first geographical area.

In some embodiments, subscribing the mobile device to receive messages targeted to the second geographical area comprises, after subscribing the mobile device to receive messages targeted to the first geographical area, subscribing the mobile device to receive messages targeted to the second geographical area without unsubscribing the mobile device from receiving messages targeted to the first geographical area.

In some embodiments, subscribing the mobile device to receive messages targeted to the first geographical area comprises receiving, from the mobile device, a first subscription request requesting that the mobile device be subscribed to receive messages targeted to the first geographical area, and subscribing the mobile device to receive messages targeted to the first geographical area in response to the first subscription request. In this case, subscribing the mobile device to receive messages targeted to the second geographical area may comprise performing a procedure. Performing the procedure may comprise receiving, from the mobile device, as part of the procedure, a second subscription request requesting that the mobile device be subscribed to receive messages targeted to the second geographical area. Performing the procedure may also comprise subscribing the mobile device to receive messages targeted to the second geographical area in response to the second subscription request. However, the server does not receive from the mobile device, as part of the procedure, an unsubscription request requesting that the mobile device be unsubscribed from receiving messages targeted to the first geographical area.

In some embodiments, subscribing the mobile device to receive messages targeted to the first geographical area and subscribing the mobile device to receive messages targeted to the second geographical area comprises receiving, from the mobile device, a single subscription request requesting that the mobile device be both subscribed to receive messages targeted to the first geographical area and subscribed to receive messages targeted to the second geographical area. In this case, the method may comprise subscribing the mobile device to receive messages targeted to the first geographical area and to receive messages targeted to the second geographical area in response to the single subscription request In some embodiments, the mobile device hosts a vehicle-to-everything, V2X, application enabler, VAE, client or hosts an intelligent transportation system, ITS, client, and the server is a VAE server or an ITS server. In this case, the messages targeted to the first geographical area and the messages targeted to the second geographical area are vehicle-to-everything, V2X, messages or intelligent transportation system, ITS, messages.

In some embodiments, the first and second geographical areas are each a tile or an area of a grid that is different from a coverage area of a cell provided by access network equipment.

In some embodiments, the second geographical area is a geographical area that the mobile device is predicted to be within after the first geographical area, that is adjacent to the first geographical area, that is included in a zone of positioning uncertainty around the mobile device, and/or that is included in a multi-area zone over which a service is provided.

Embodiments herein also include corresponding apparatus, computer programs, and carriers, e.g., non-transitory computer-readable mediums. For example, embodiments herein include a mobile device. The mobile device is configured (e.g., via communication circuitry and processing circuitry) to subscribe to receive messages targeted to a first geographical area. The mobile device is also configured to subscribe to receive messages targeted to a second geographical area such that the mobile device is simultaneously subscribed to receive messages targeted to the first geographical area and to receive messages targeted to the second geographical area.

Embodiments herein also include a server. The server is configured (e.g., via communication circuitry and processing circuitry) to subscribe a mobile device to receive messages targeted to a first geographical area. The server is also configured to subscribe the mobile device to receive messages targeted to a second geographical area such that the mobile device is simultaneously subscribed to receive messages targeted to the first geographical area and to receive messages targeted to the second geographical area.

BRIEF DESCRIPTION OF THE DRAWINGS

FIG. 2A is a timing diagram showing timing with which a mobile device subscribes to receive messages targeted to a first geographical area and subscribes to receive messages targeted to a second geographical area, according to some embodiments.

FIG. 2B is a timing diagram showing timing with which a mobile device subscribes to receive messages targeted to a first geographical area and subscribes to receive messages targeted to a second geographical area, according to other embodiments.

FIG. 3A is a call flow diagram of a single procedure for subscribing a mobile device to receive messages targeted to one geographical area, and for optionally unsubscribing the mobile device from receiving messages targeted to another geographical area.

DETAILED DESCRIPTION

Figure 1:
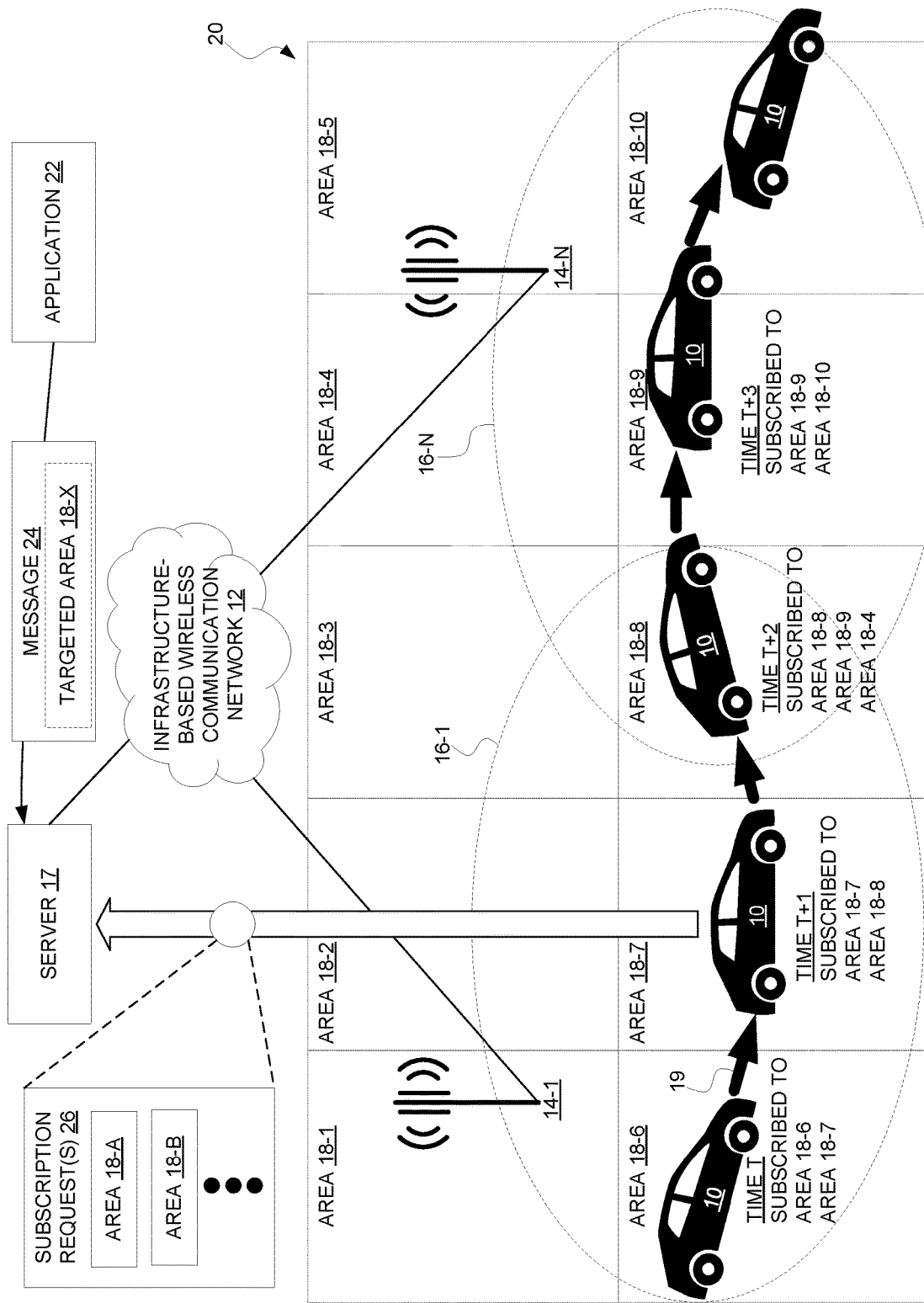
FIG. 1 is a block diagram of a mobile device and a server according to some embodiments.

FIG. 1 shows a mobile device 10 within the coverage of an infrastructure-based wireless communication network 12 according to some embodiments. The mobile device 10 in the example shown is integrated within or is otherwise associated with a vehicle for vehicle-to-everything (V2X) communication, but in other examples may be any type of device capable of wireless communication. The infrastructure-based wireless communication network 12 provides radio access via multiple radio access points 14-1 . . . 14-N that are geographically distributed.

In embodiments where the infrastructure-based wireless communication network 12 is a cellular network as shown, each radio access point provides radio coverage over one or more cells. Different cells may be associated with different cell-specific reference signals or System Information, and/or may be associated with different cell identities such as different Physical Cell Identities (PC's) and/or different Cell Global Identities (CGIs). FIG. 1 in this regard shows as an example that radio access point 14-1 provides radio coverage over cell 16-1 whereas radio access point 14-N provides radio coverage over cell 16-N.

FIG. 1 also shows a server 17 that provides or facilitates geographical area message distribution, e.g., using, via, or on top of the infrastructure-based wireless communication network 12. The server 17 may take the form of an application layer server in a data network external to the infrastructure-based wireless communication network 12 as shown, or in other embodiments not shown may be integrated in the infrastructure-based wireless communication network 12. In either case, the server 17 may provide or facilitate geographical area message distribution by exploiting the division of geography into multiple geographical areas 18-1, 18-2, . . . 18-M, ten of which are shown in FIG. 1 as 18-1 through 18-10. In the example shown, for instance, a grid 20 is overlaid onto a geography, and different ones of the geographical areas 18-1, 18-2, . . . 18-M correspond to different areas (or tiles) of the grid 20, e.g., associated with an Intelligent Transportation System (ITS) or cooperative ITS that employs the infrastructure-based wireless communication network 12 in cooperation with a vehicular ad-hoc wireless communication network. In these and other examples, then, the geographical areas 18-1 . . . 18-M may be distinguished from the coverage areas of respective cells 16-1 . . . 16-N provided by the radio access points 14-1 . . . 14-N. In fact, the geographical areas 18-1 . . . 18-M may be formed at an application layer and/or be formed independently of cells 16-1 . . . 16-N.

In any event, the server 17 may exploit this division of the geography into multiple geographical areas 18-1, 18-2, . . . 18-M so that a message can target a certain geographical area, as opposed to targeting a certain recipient irrespective of the recipient's location. Indeed, a message targeting a certain geographical area targets any recipients that are located in that certain geographical area, instead of necessarily targeting those recipients individually. FIG. 1 in this regard shows that an application 22 may transmit to the server 17 a message 24 targeting a certain geographical area 18-X. The message 24 may for example be an application layer message that includes an identifier of the certain geographical area 18-X at the application layer, rather than an identifier of any individual recipient. In fact, in some embodiments, the server 17 may be a GeoCast server and the message 24 may be a GeoCast message that is to be geocast via the infrastructure-based wireless communication network 12. Alternatively or additionally, where the mobile device 10 hosts a V2X application enabler (VAE) client or an ITS client, the message 24 may be a V2X message or an ITS message.

In any event, the server 17 in this context fields requests from mobile devices to subscribe to receive any messages targeting a specified geographical area. The server 17 tracks which mobile devices are subscribed to receive messages targeting which geographical areas. Accordingly, upon receiving the message 24 from application 22, the server 17 identifies which mobile devices are subscribed to receive messages targeting geographical area 18-X. The server 17 then selectively forwards the message 24 to those identified mobile devices. In some sense, therefore, the server 17 maps the identifier of the targeted geographical area 18X into identities of mobile devices subscribed to receive messages targeting that area 18X, for use in selectively forwarding the message 24 to those mobile devices.

Notably, some embodiments herein enable a mobile device 10 to be subscribed to receive messages targeting one geographical area (e.g., area 18-7), at the same time as the mobile device 10 is subscribed to receive messages targeting another geographical area (e.g., area 18-8). Where a subscription to receive messages targeting a geographical area is referred to as simply a subscription to that geographical area, some embodiments enable the mobile device 10 to be simultaneously subscribed to multiple ones of the geographical areas 18-1 . . . 18-M. While so simultaneously subscribed, the mobile device 10 may receive messages targeting any of multiple ones of the geographical areas 18-1 . . . 18-M, rather than being limited to receiving only messages targeting a particular one of the geographical areas 18-1 . . . 18-M.

Simultaneous subscription to multiple ones of the geographical areas 18-1 . . . 18-M in this regard refers to the fact that the times during which the mobile device 10 is subscribed to receive messages targeting one geographical area (e.g., area 18-7) at least partially overlap with the times during which the mobile device 10 is subscribed to receive messages targeting another geographical area (e.g., area 18-8). Note here that the time at which the mobile device's subscription to one geographical area starts need not be the same as the time at which the mobile device's subscription to another geographical area starts. Accordingly, the act of subscribing to one geographical area need not be simultaneous with the act of subscribing to another geographical area. Rather, the state of being subscribed to one geographical area overlaps in time with the state of being subscribed to another geographical area, such that, at some point in time, the mobile device 10 is both in the state of being subscribed to one geographical area and in the state of being subscribed to another geographical area.

FIG. 1 for example shows that the mobile device 10 is configured to transmit one or more subscription requests 26 to the server 17. Via the subscription request(s) 26, the mobile device subscribes to receive messages targeted to a first geographical area 18-A (e.g., 18-7) and subscribes to receive messages targeted to a second geographical area 18-B (e.g., 18-8). In some embodiments, the subscription request(s) 26 comprise a single request that requests both subscription of the mobile device 10 to receive messages targeted to the first geographical area 18-A and subscription of the mobile device 10 to receive messages targeted to the second geographical area 18-B. In this case, the mobile device's subscription to receive messages targeted to the first geographical area 18-A may start at the same time as the mobile device's subscription to receive messages targeted to the second geographical area 18-B.

As shown in FIG. 2A, for example, the mobile device 10 at time T_C may transmit a single subscription request 26-C that requests both subscription of the mobile device 10 to receive messages targeted to the first geographical area 18-A and subscription of the mobile device 10 to receive messages targeted to the second geographical area 18-B. Generally, then, both the mobile device's subscription to receive messages targeted to the first geographical area 18-A and the mobile device's subscription to receive messages targeted to the second geographical area 18-B start at time T_C. The subscriptions may nonetheless end at different times. In the example of FIG. 2A, the subscription to receive messages targeted to the first geographical area 18-A ends at time T_A_END, which is earlier than time T_B_END when the subscription to receive messages targeted to the second geographical area 18-B ends. Nevertheless, during the time interval between T_C and T_A_END, the mobile device 10 is simultaneously subscribed to receive messages targeted to the first geographical area 18-A and subscribed to receive messages targeted to the second geographical area 18-B.

In other embodiments, though, the subscription request(s) 26 comprise multiple subscription requests, including one subscription request that requests subscription of the mobile device 10 to receive messages targeted to the first geographical area 18-A and another subscription request that requests subscription of the mobile device 10 to receive messages targeted to the second geographical area 18-B. In this case, the mobile device's subscription to receive messages targeted to the second geographical area 18-B may start after the mobile device's subscription to receive messages targeted to the first geographical area 18-A starts, but before the mobile device's subscription to receive messages targeted to the first geographical area 18-A ends.

As shown in FIG. 2B, for example, the mobile device 10 at time T_A_START transmits a subscription request 26-A that requests subscription of the mobile device 10 to receive messages targeted to the first geographical area 18-A. Generally, then the mobile device's subscription to receive messages targeted to the first geographical area 18-A starts at time T_A_START. After subscribing to receive messages targeted to the first geographical area 18-A in this way, the mobile device 10 at time T_B_START transmits a subscription request 26-B that requests subscription of the mobile device 10 to receive messages targeted to the second geographical area 18-B. Generally, then the mobile device's subscription to receive messages targeted to the second geographical area 18-B starts at time T_B_START. Notably, though, the mobile device subscribes to receive messages targeted to the second geographical area 18-B in this way while remaining subscribed to receive messages targeted to the first geographical area 18-A, i.e., without unsubscribing from receiving messages targeted to the first geographical area 18-A. As shown, for instance, the mobile device's subscription to receive messages targeted to the first geographical area 18-A does not end until time T_A_END, which is after time T_B_START. Accordingly, during the time interval between T_B_START and T_A_END, the mobile device 10 is simultaneously subscribed to receive messages targeted to the first geographical area 18-A and subscribed to receive messages targeted to the second geographical area 18-B.

In these and other embodiments, simultaneous subscription may be accomplished by the mobile device 10 performing the procedure 25 shown in FIG. 3A. The procedure 25 involves a first step of transmitting, from the mobile device 10 to the server 17, a subscription request 26 requesting that the mobile device 10 be subscribed to receive messages targeted to a geographical area (e.g., area 18-B). In some embodiments, a second step of the procedure 25 is the server 17 transmitting to the mobile device 10 a subscription response 27, e.g., indicating a result of the request 26. A third step of the procedure 25 is the mobile device 10 transmitting to the server 17 an unsubscription request 28 requesting that the mobile device 10 be unsubscribed from receiving messages targeted to a geographical area (e.g., area 18-A). And a fourth step of the procedure 25 is the server 17 transmitting an unsubscription response 29, e.g., indicating a result of the request 28. Notably, though, the third step of the procedure 25 is optional and need not be performed as part of the procedure 25. This means that the mobile device 10 may perform the first step of the procedure 25 for subscribing to one geographical area, but not perform the third step of the procedure 25 for unsubscribing from another geographical area, so that, after completion of the procedure 25, the mobile device 10 will be subscribed to both geographical areas.

Figure 3B:
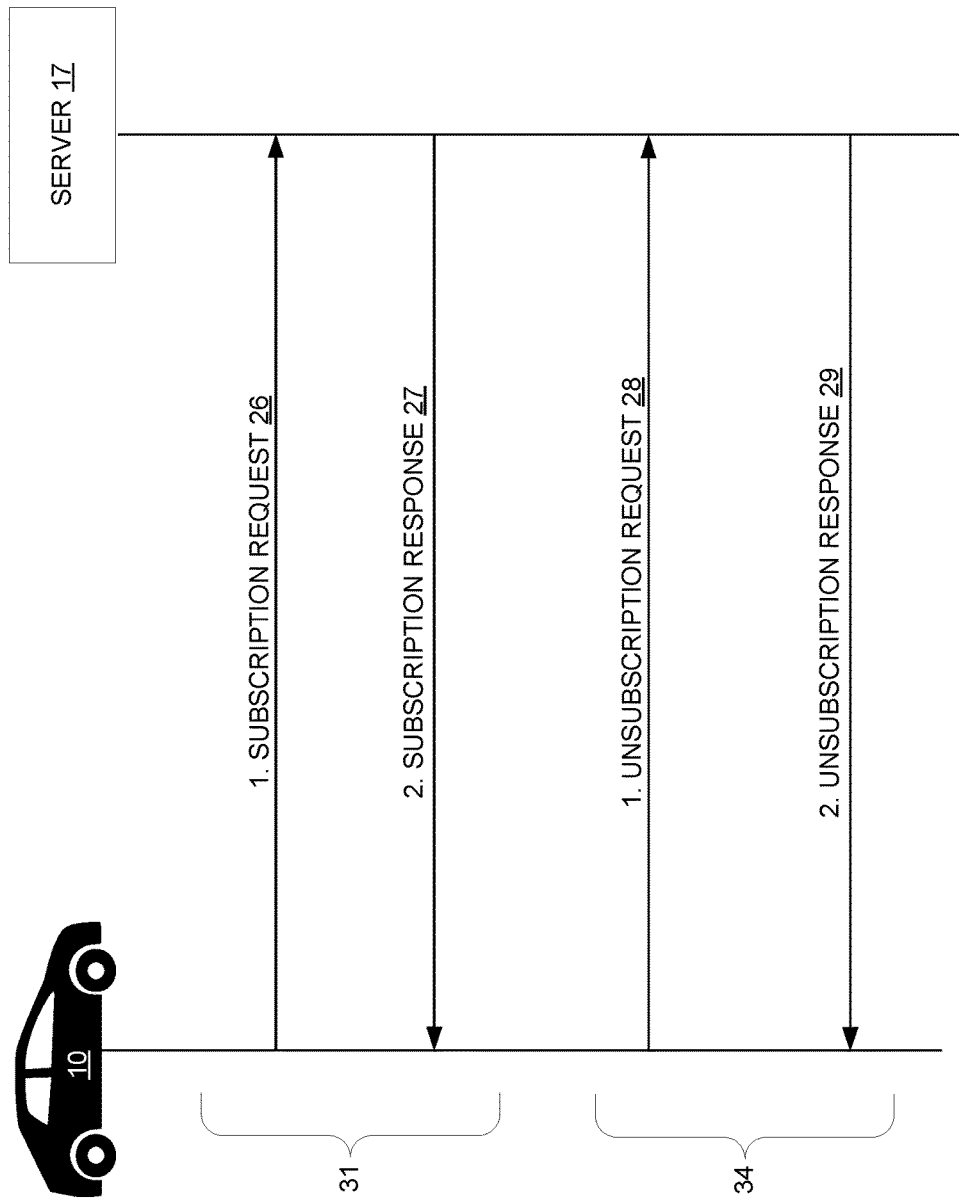
FIG. 3B is a call flow diagram of separate procedures for subscribing a mobile device to receive messages targeted to a geographical area, and for unsubscribing the mobile device from receiving messages targeted to a geographical area.

FIG. 3B shows yet other embodiments where, rather than a single procedure for subscribing to one area and for optionally unsubscribing to another area, separate procedures are defined for subscription and unsubscription. As shown, a subscription procedure 31 involves a first step of transmitting, from the mobile device 10 to the server 17, a subscription request 26 requesting that the mobile device 10 be subscribed to receive messages targeted to a geographical area (e.g., area 18-B). In some embodiments, a second step of the procedure 31 is the server 17 transmitting to the mobile device 10 a subscription response 27, e.g., indicating a result of the request 26. Notably, this subscription procedure 31 does not include any step for unsubscribing from a geographical area, meaning that no such step is required or even optional. Instead, a separate unsubscription procedure 34 is defined. As shown, the unsubscription procedure involves in a first step the mobile device 10 transmitting to the server 17 an unsubscription request 28 requesting that the mobile device 10 be unsubscribed from receiving messages targeted to a geographical area (e.g., area 18-A). And a fourth step of the unsubscription procedure 34 is the server 17 transmitting an unsubscription response 29, e.g., indicating a result of the request 28. According to embodiments herein that exploit these separate subscription and unsubscription procedures 31, 34, the mobile device 10 may perform the subscription procedure 31 for subscribing to one geographical area, before or even without performing the unsubscription procedure 34 for unsubscribing from another geographical area. This way, after completion of the subscription procedure 31, the mobile device 10 will be subscribed to both geographical areas.

No matter the particular way in which simultaneous subscription is accomplished, though, such simultaneous subscription may prove advantageous in a number of contexts. As shown in FIG. 1, for example, the mobile device 10 may be within geographical area 18-6 at time T. Based on the mobile device's position being within geographical area 18-6, the mobile device 10 may be subscribed to receive messages targeted to geographical area 18-6. In addition, though, the mobile device 10 (or another entity) may predict at time T that the mobile device 10 will be within adjacent geographical area 18-7 by time T+1. Such prediction may for instance be based on the mobile device's current trajectory 19. Based on this prediction, the mobile device 10 may also subscribe to receive messages targeted to geographical area 18-7. That is, the mobile device 10 may subscribe to receive messages targeted to geographical area 18-7 even when the mobile device 10 is not within geographical area 18-7, e.g., before the mobile device 10 is, or is determined to be, within geographical area 18-7. Accordingly, at time T, the mobile device 10 is positioned within geographical area 18-6. And, at time T, the mobile device 10 is not only subscribed to receive messages targeted to geographical area 18-6, but is also subscribed to receive messages targeted to geographical area 18-7.

This process of pre-subscribing to a geographical area in which the mobile device 10 is predicted to be within may continue in this example such that, at time T+1, the mobile device 10 is positioned within geographical area 18-7, and is not only subscribed to receive messages targeted to geographical area 18-7 but is also subscribed to receive messages targeted to geographical area 18-8. At time T+2, though, it is predicted that the mobile device 10 will move to either geographical area 18-4 or geographical area 18-9. Accordingly, the mobile device 10 at time T+2 is not only subscribed to receive messages targeted to geographical area 18-8, but is also subscribed to receive messages targeted to geographical area 18-9 and to receive messages targeted to geographical area 18-4. Finally, as a last example, at time T+3, it is predicted that the mobile device 10 will move to geographical area 18-10. Based on this, the mobile device 10 at time T+3 is not only subscribed to receive messages targeted to geographical area 18-9, but is also subscribed to receive messages targeted to geographical area 18-10.

Some embodiments thereby predict the next geographical area the mobile device 10 will be within after it leaves its current geographical area, and then proactively subscribe the mobile device 10 to receive messages targeted to the next geographical area, without unsubscribing the mobile device 10 from receiving messages targeted to its current geographical area. This may advantageously avoid service interruption that would occur if the mobile device 10 were late in subscribing to the next geographical area it will be within.

Alternatively or additionally, simultaneous subscription herein may prove advantageous in a different context. In some embodiments, for example, there is some uncertainty about the exact position of the mobile device 10, e.g., especially as the mobile device 10 moves between geographical areas. This may be due for instance to positioning inaccuracy. No matter the cause, though, a zone of positioning uncertainty around the mobile device 10 represents the different possibilities for the mobile device's actual position. In some embodiments, the mobile device 10 is simultaneously subscribed to multiple geographical areas, each of which at least partially overlaps with this zone of positioning uncertainty. Such simultaneous subscription effectively hedges against the mobile device 10 actually being positioned within any of those geographical areas, to ensure that the mobile device 10 will not miss a message targeting the geographical area the mobile device is actually within. In this way, simultaneous subscription to multiple geographical areas may advantageously mitigate the effects of positioning inaccuracy delivery.

In still another context, a service (e.g., a 2 km hazard warning service) may be provided over a multi-area zone that spans multiple ones of the geographical areas 18-1 . . . 18-M. In this case, the mobile device 10 may be simultaneously subscribed to the multiple geographical areas that the multi-area zone span. This not only enables multi-area services but also allows the mobile device 10 to receive a service beyond its current geographical area while continuing to receive a service which corresponds to its current geographical area.

Figure 4:
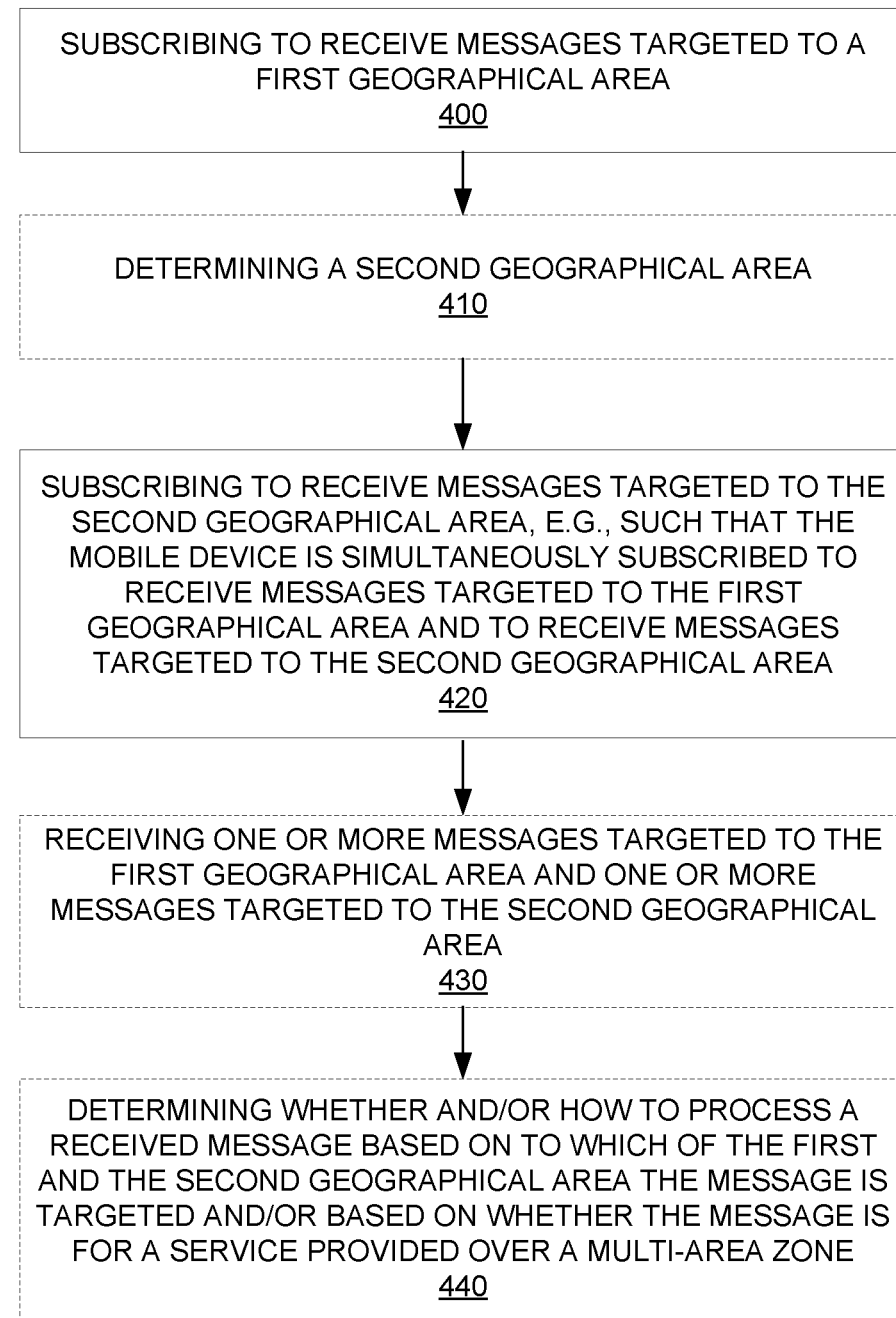
FIG. 4 is a logic flow diagram of a method performed by a mobile device according to some embodiments.

In view of the modifications and variations herein, FIG. 4 depicts a method performed by a mobile device 10 (e.g., a user equipment, UE, or vehicle which hosts a VAE client or ITS client) in accordance with particular embodiments. The method includes subscribing to receive messages targeted to a first geographical area 18-A (Block 400). This may entail for instance transmitting a subscription request 26 (e.g., to a server 17, such as a VAE server) requesting that the mobile device 10 be subscribed to receive messages targeted to the first geographical area 18-A. Regardless, the method may further comprise subscribing to receive messages targeted to a second geographical area 18-B, e.g., while remaining subscribed to receive messages targeted to the first geographical area 18-A and/or such that the mobile device 10 is simultaneously subscribed to receive messages targeted to the first geographical area 18-A and to receive messages targeted to the second geographical area 18-B (Block 420). In some embodiments, this may also entail transmitting a subscription request 26 requesting that the mobile device 10 be subscribed to receive messages targeted to the second geographical area 18-B. In fact, in some embodiments, the same subscription request 26-C may request that the mobile device 10 be subscribed to receive messages targeted to the first geographical area 18-A as well as request that the mobile device 10 be subscribed to receive messages targeted to the second geographical area 18-B. In any event, the mobile device 10 according to the method in FIG. 4 is notably simultaneously subscribed to multiple geographical areas, rather than only being subscribed to one geographical area at a time. And this status of being simultaneously subscribed to multiple geographical areas may persist for more than a short transient period, e.g., even after completing the full procedure 25 for subscribing to the second geographical area 18-B.

In some embodiments, the method in FIG. 4 further includes determining the second geographical area 18-B (Block 410). In one embodiment, the second geographical area 18-B is a geographical area that the mobile device 10 is predicted to be within after the first geographical area 18-A. In this case, the determination of the second geographical area 18-B may comprise predicting that the mobile device 10 will be within the second geographical area 18-B after the first geographical area 18-A, e.g., based on a trajectory or other positioning information of the mobile device 10, such as exemplified in FIG. 15 below. The prediction may enable the mobile device 10 to thereby subscribe to receive messages targeted to the second geographical area 18-B before the mobile device 10 is, or is determined to be, within the second geographical area 18-B. This may also be referred to herein as pre-subscribing to receive messages targeted to the second geographical area 18-B, e.g., because the mobile device 10 subscribes to receive such messages prior to the mobile device 10 being within the second geographical area 18-B. Some embodiments may for example exploit knowledge about known trajectory information to pre-subscribe to a new geographical area, e.g., as exemplified in the description of FIG. 15. These and other embodiments may therefore use look-ahead knowledge about trajectory to provide better services.

Alternatively or additionally, the second geographical area 18-B may be a geographical area that is adjacent to the first geographical area 18-A and/or be included in a zone of positioning uncertainty around the mobile device 10. These and other embodiments may therefore account for positioning uncertainties, e.g., by subscribing to adjacent geographical areas that the mobile device 10 moves between in order to account for uncertainty as to when the device 10 actually crosses the border between the areas. This example demonstrates, then, that the mobile device 10 in some embodiments may be simultaneously subscribed to receive messages from both the first and the second geographical areas 18-A, 18-B when moving between the first and second geographical areas. These and other embodiments may advantageously reduce service interruptions due to position inaccuracy.

Alternatively or additionally, the second geographical area 18-B may be a geographical area that is included in a multi-area zone over which a service is provided, e.g., a 2 km hazard warning service. These and other embodiments may therefore enable subscription to services that span multiple geographical service areas.

Regardless of the particular nature of the second geographical area 18-B, the method in some embodiments further comprises receiving one or more messages targeted to the first geographical area 18-A and one or more messages targeted to the second geographical area 18-B (Block 430). The messages may be received as part of geocasting for the first and second geographical areas, e.g., the messages may be geocast messages that are geocast via a cellular network. Indeed, the messages may be received while the mobile device 10 is subscribed to both the first and second geographical areas 18-A, 18-B.

In some embodiments, the method also includes determining whether and/or how to process the received message based on to which of the first and the second geographical area the message is targeted and/or based on whether the message is for the service provided over the multi-area zone (Block 440). In some embodiments, for instance, the method includes processing or refraining from processing the received message depending respectively on whether the message is targeted to the first or the second geographical area. For instance, the mobile device 10 may not process a message targeted to the second geographical area 18-B if the device is not yet within that area, but instead may wait until the device is in the second geographical area 18-B as predicted. Alternatively or additionally, the method may comprise processing the received message if the message is targeted to the first geographical area 18-A or is for the service provided over the multi-area zone.

Figure 5:
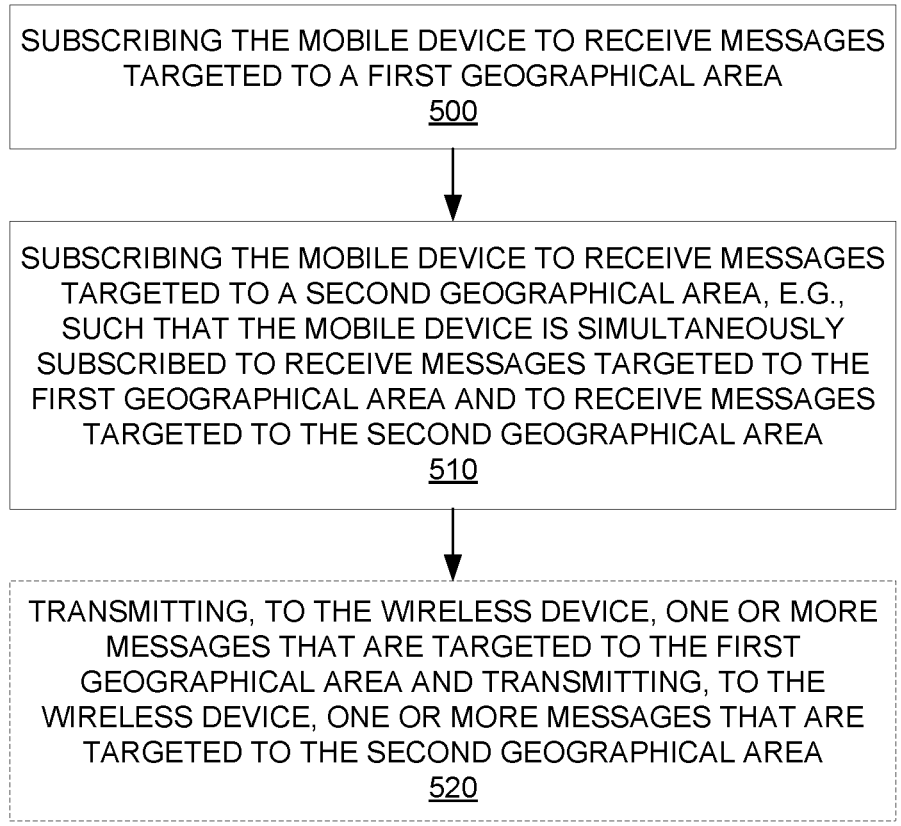
FIG. 5 is a logic flow diagram of a method performed by a server according to some embodiments.

FIG. 5 depicts a method performed by a server 17 (e.g., a VAE server, an ITS server, or a location server) in accordance with corresponding embodiments. The method includes subscribing a mobile device 10 (e.g., a user equipment, UE, or vehicle which hosts a VAE client or ITS client) to receive messages targeted to a first geographical area 18-A (Block 500). The method as shown also includes subscribing the mobile device 19 to receive messages targeted to a second geographical area 18-B, e.g., while continuing to subscribe the mobile device 10 to receive messages targeted to the first geographical area 18-A and/or such that the mobile device 10 is simultaneously subscribed to receive messages targeted to the first geographical area 18-A and to receive messages targeted to the second geographical area 18-B (Block 510).

In some embodiments, this may entail receiving a subscription request 26 (e.g., to a server, such as a VAE server) requesting that the mobile device 10 be subscribed to receive messages targeted to the first geographical area 18-A, and receiving subscription request 26 requesting that the mobile device 10 be subscribed to receive messages targeted to the second geographical area 18-B, without receiving an unsubscription request requesting that the mobile device 10 be unsubscribed from receiving messages targeted to the first geographical area 18-A. In fact, in some embodiments, the same subscription request 26-C may request that the mobile device 10 be subscribed to receive messages targeted to the first geographical area 18-A as well as request that the mobile device 10 be subscribed to receive messages targeted to the second geographical area 18-B. In any event, the mobile device 10 according to the method in FIG. 5 is notably simultaneously subscribed to multiple geographical areas, rather than only being subscribed to one geographical area at a time. And this status of being simultaneously subscribed to multiple geographical areas may persist for more than a short transient period, e.g., even after completing the full procedure 25 for subscribing to the second geographical area 18-B.

In one embodiment, the second geographical area 18-B is a geographical area that the mobile device is predicted to be within after the first geographical area 18-A. Alternatively or additionally, the second geographical area 18-B may be a geographical area that is adjacent to the first geographical area 18-A and/or be included in a zone of positioning uncertainty around the mobile device 10. Alternatively or additionally, the second geographical area 18-B may be a geographical area that is included in a multi-area zone over which a service is provided, e.g., a 2 km hazard warning service. These and other embodiments may therefore enable subscription to services that span multiple geographical service areas.

In some embodiments, the method also comprises transmitting, to the mobile device 10, one or more messages that are targeted to the first geographical area 18-A and transmitting, to the mobile device 10, one or more messages that are targeted to the second geographical area 18-B (Block 520). In some embodiments, the transmitting is performed by geocasting the messages, e.g., via a cellular network.

Figure 6:
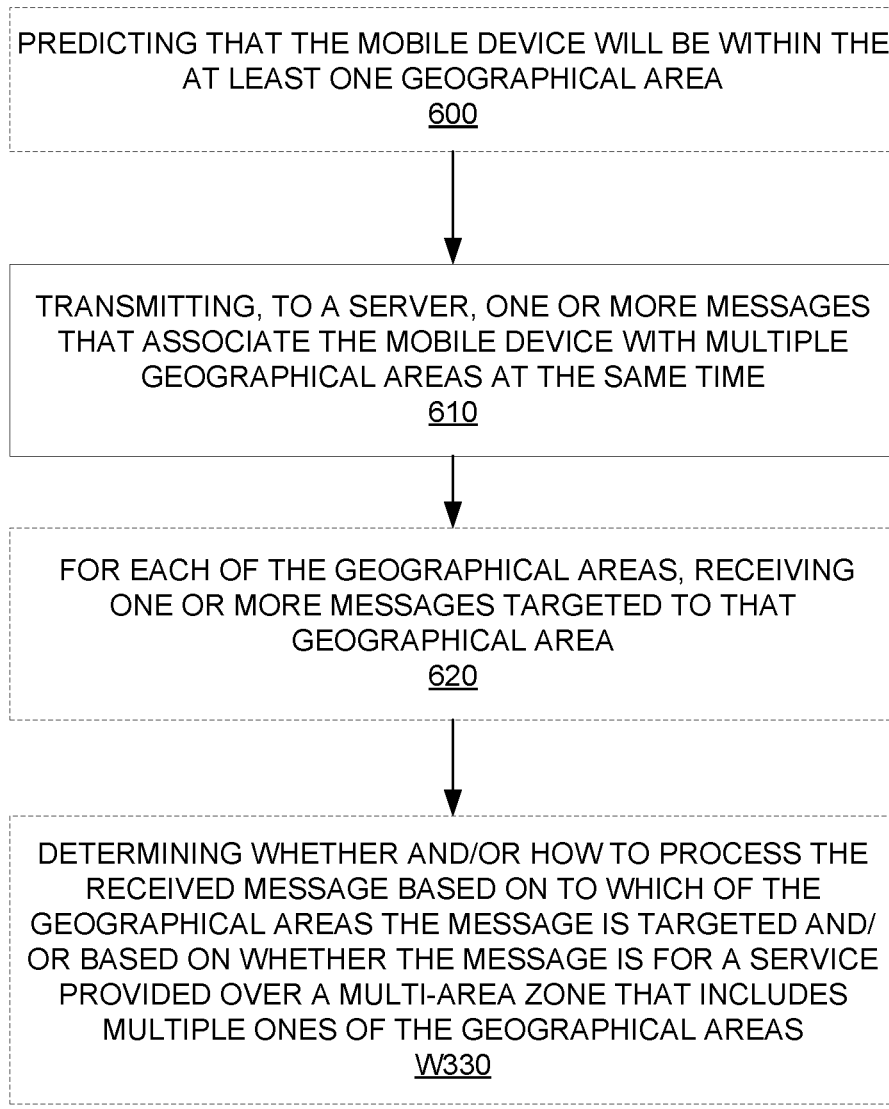
FIG. 6 is a logic flow diagram of a method performed by a mobile device according to other embodiments.

FIG. 6 depicts a method performed by a mobile device 10 (e.g., a user equipment, UE, or vehicle which hosts a VAE client or ITS client) in accordance with other particular embodiments. The method includes transmitting, to a server 17, one or more messages that associate the mobile device 10 with multiple geographical areas 18-A, 18-B at the same time (Block 610). In some embodiments, for example, the one or more messages request subscription of the mobile device 10 to, or subscribe the mobile device 10 to, the multiple geographical areas 18-A, 18-B at the same time, e.g., in order for the mobile device 10 to receive messages targeted to those multiple geographical areas. In other words, the mobile device 10 is simultaneously subscribed to receive messages targeted to the multiple geographical areas 18-A, 18-B. In at least some embodiments, the one or more messages request subscription of the mobile device 10 to, or subscribe the mobile device 10 to, at least one of the geographical areas before the mobile device is located in that geographical area. Alternatively or additionally, at least one of the geographical areas is a geographical area that the mobile device 10 is predicted to be within after being within a different one of the geographical areas. In this case, then, the method as shown may also include predicting that the mobile device 10 will be within the at least one geographical area (Block 600), such as exemplified in FIG. 15 below. The prediction may enable the mobile device 10 to thereby subscribe to receive messages targeted to that geographical area before the mobile device is, or is determined to be, within the geographical area. This may also be referred to herein as pre-subscribing to receive messages targeted to the at least one geographical area, e.g., because the mobile device 10 subscribes to receive such messages prior to the mobile device 10 being within that geographical area. Some embodiments may for example exploit knowledge about known trajectory information to pre-subscribe to a new geographical area, e.g., as exemplified in the description of FIG. 15. These and other embodiments may therefore use look-ahead knowledge about trajectory to provide better services.

Alternatively or additionally, at least two of the geographical areas are adjacent to one another and/or at least one of the geographical areas is included in a zone of positioning uncertainty around the mobile device. These and other embodiments may therefore account for positioning uncertainties, e.g., by subscribing to adjacent geographical areas that the mobile device moves between in order to account for uncertainty as to when the mobile device 10 actually crosses the border between the areas. This example demonstrates, then, that the mobile device in some embodiments may be simultaneously subscribed to receive messages from the geographical areas when moving between the geographical areas. These and other embodiments may advantageously reduce service interruptions due to position inaccuracy.

Alternatively or additionally, at least one of the geographical areas is included in a multi-area zone over which a service is provided, e.g., a 2 km hazard warning service. These and other embodiments may therefore enable subscription to services that span multiple geographical service areas.

Regardless, the method in some embodiments further comprises, for each of the geographical areas, receiving one or more messages targeted to that geographical area (Block 620). The messages may be received as part of geocasting for the geographical areas. Indeed, the messages may be received while the mobile device is simultaneously subscribed to the multiple geographical areas.

In some embodiments, the method also includes determining whether and/or how to process a received message based on to which of the geographical areas the message is targeted and/or based on whether the message is for a service provided over a multi-area zone (Block 630). In some embodiments, for instance, the method includes processing or refraining from processing the received message depending respectively on whether the message is targeted to a geographical area in which the mobile device 10 is currently located or is targeted to a geographical area in which the mobile device 10 is predicted to be located in. For instance, the mobile device may not process a message targeted to a geographical area if the device is not yet within that area, but instead may wait until the mobile device 10 is in the geographical area as predicted. Alternatively or additionally, the method may comprise processing the received message if the message is targeted to a geographical area in which the mobile device 10 is currently located or is targeted or is for the service provided over the multi-area zone.

Figure 7:
FIG. 7 is a logic flow diagram of a method performed by a server according to other embodiments.

FIG. 7 depicts a method performed by a server 17 (e.g., a VAE server, an ITS server, or a location server) in accordance with corresponding embodiments. The method includes receiving, from a mobile device 10 (e.g., a user equipment, UE, or vehicle which hosts a VAE client or ITS client), one or more messages that associate the mobile device with multiple geographical areas 18-A, 18-B at the same time (Block 700). For example, in some embodiments, the one or more messages request subscription of the mobile device 10 to, or subscribe the mobile device 10 to, the multiple geographical areas at the same time in order for the mobile device 10 to receive messages targeted to those multiple geographical areas.

In some embodiments, the method also comprises, for each of the geographical areas, transmitting one or more messages targeted to that geographical area (Block 710). In some embodiments, the transmitting is performed by geocasting the messages, e.g., via a cellular network.

Figure 8:
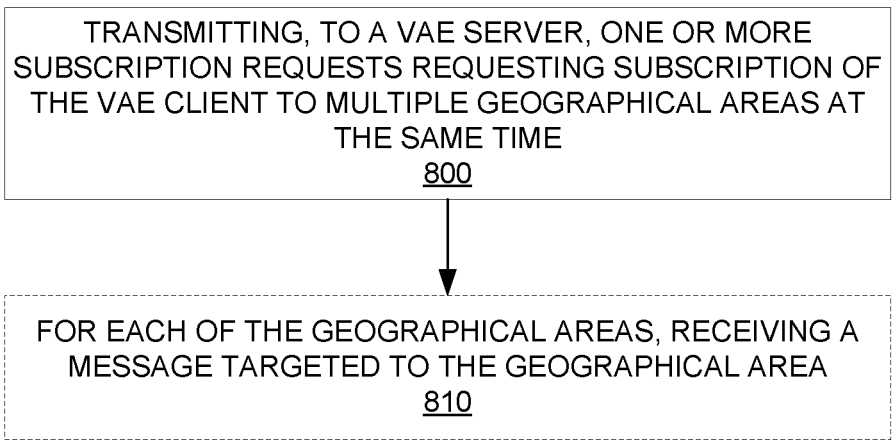
FIG. 8 is a logic flow diagram of a method performed by a VAE client according to some embodiments.

FIG. 8 depicts a method performed by a VAE client (e.g., as hosted on a mobile device 10, such as a UE or vehicle) in accordance with other particular embodiments. The method includes transmitting, to a VAE server, one or more subscription requests 26 requesting subscription of the VAE client to multiple geographical areas 18-A, 18-B at the same time (Block 800). For example, in some embodiments, the one or more subscription requests 26 comprise a single subscription request that identifies the multiple geographical areas. Regardless, the method in some embodiments also includes, for each of the geographical areas, receiving a message targeted to the geographical area (Block 810).

Figure 9:
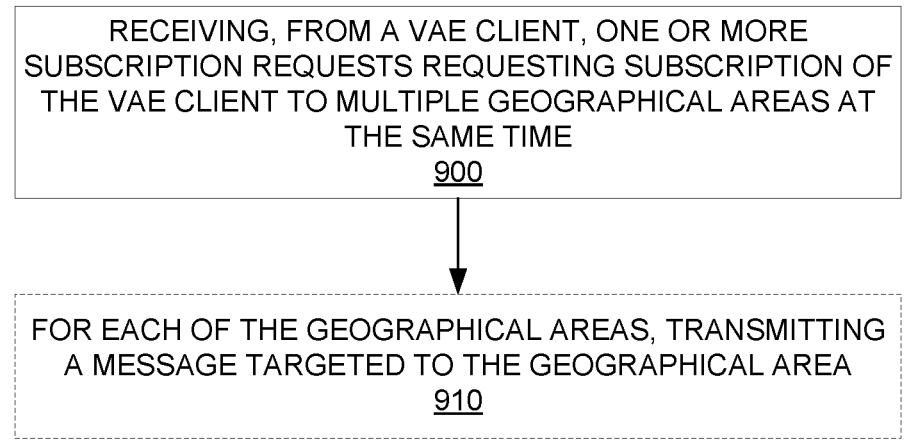
FIG. 9 is a logic flow diagram of a method performed by a VAE server according to some embodiments.

FIG. 9 depicts a corresponding method performed by a VAE server in accordance with some embodiments. The method as shown includes receiving, from a VAE client (e.g., as hosted on a mobile device 10, such as a UE or vehicle), one or more subscription requests 26 requesting subscription of the VAE client to multiple geographical areas at the same time (Block 900). For example, in some embodiments, the one or more subscription requests 26 comprise a single subscription request that identifies the multiple geographical areas. Regardless, the method in some embodiments also includes, for each of the geographical areas, transmitting a message targeted to the geographical area (Block 910).

In any of the embodiments described herein, e.g., within FIGS. 4-9, a geographical area may refer to an area of a grid, a tile, or a geographical area identifier, e.g., associated with an ITS or cooperative ITS that employs an infrastructure-based wireless communication network in cooperation with a vehicular ad-hoc wireless communication network. In these and other embodiments, a geographical area may be distinguished from a coverage area of or cell provided by access network equipment.

Also in any of the embodiments, the message(s) targeted to a geographical area may in some embodiments include an event notification message (e.g., a CAM or DEMN message) that notifies the mobile device 10 about the occurrence of events that are pertinent to travel conditions in the geographical area, such as the occurrence of traffic, a collision, hazardous road conditions, or the like. The server 17 as described herein may accordingly determine which mobile devices are within the area(s) affected by such events based on its area-by-area tracking of device locations, and send an event notification message to those devices, e.g., via an infrastructure-based network.

Embodiments herein also include corresponding apparatuses. Embodiments herein for instance include a mobile device configured to perform any of the steps of any of the embodiments described above for the mobile device.

Embodiments also include a mobile device 10 comprising processing circuitry and power supply circuitry. The processing circuitry is configured to perform any of the steps of any of the embodiments described above for the mobile device. The power supply circuitry is configured to supply power to the mobile device 10.

Embodiments further include a mobile device 10 comprising processing circuitry. The processing circuitry is configured to perform any of the steps of any of the embodiments described above for the mobile device 10. In some embodiments, the mobile device further comprises communication circuitry.

Embodiments further include a mobile device 10 comprising processing circuitry and memory. The memory contains instructions executable by the processing circuitry whereby the mobile device 10 is configured to perform any of the steps of any of the embodiments described above for the mobile device 10.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the mobile device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a server 17 configured to perform any of the steps of any of the embodiments described above for the server 17.

Embodiments also include a server 17 comprising processing circuitry and power supply circuitry. The processing circuitry is configured to perform any of the steps of any of the embodiments described above for the server 17. The power supply circuitry is configured to supply power to the server 17.

Embodiments further include a server 17 comprising processing circuitry. The processing circuitry is configured to perform any of the steps of any of the embodiments described above for the server 17. In some embodiments, the server 17 further comprises communication circuitry.

Embodiments further include a server 17 comprising processing circuitry and memory. The memory contains instructions executable by the processing circuitry whereby the server 17 is configured to perform any of the steps of any of the embodiments described above for the server 17.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 10:
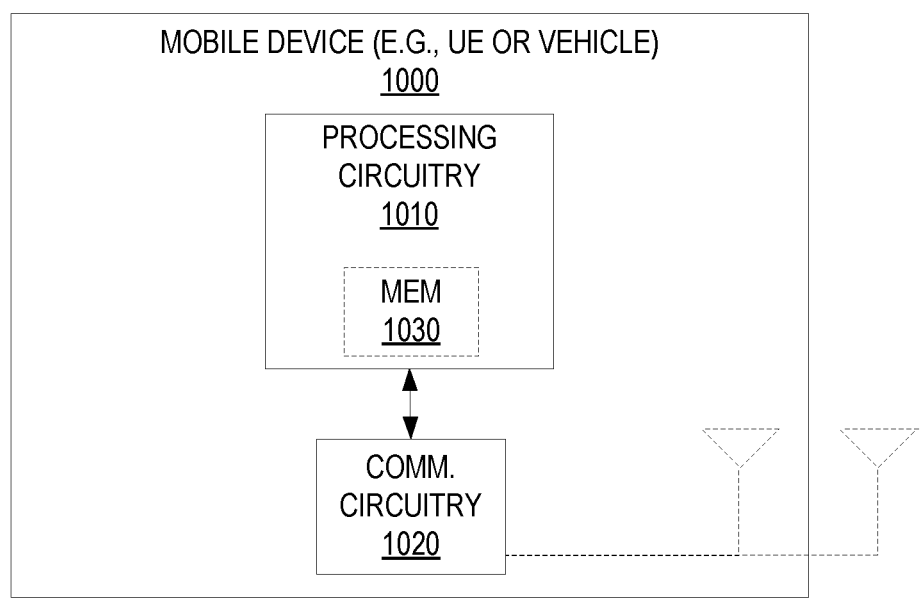
FIG. 10 is a block diagram of a mobile device according to some embodiments.

FIG. 10 for example illustrates a mobile device 1000 (e.g., mobile device 10) as implemented in accordance with one or more embodiments. As shown, the mobile device 1000 includes processing circuitry 1010 and communication circuitry 1020. The communication circuitry 1020 (e.g., radio circuitry) is configured to transmit and/or receive information to and/or from one or more other nodes, e.g., via any communication technology. Such communication may occur via one or more antennas that are either internal or external to the mobile device 1000. The processing circuitry 1010 is configured to perform processing described above, e.g., in FIGS. 4, 6, and/or 8, such as by executing instructions stored in memory 1030. The processing circuitry 1010 in this regard may implement certain functional means, units, or modules.

Figure 11:
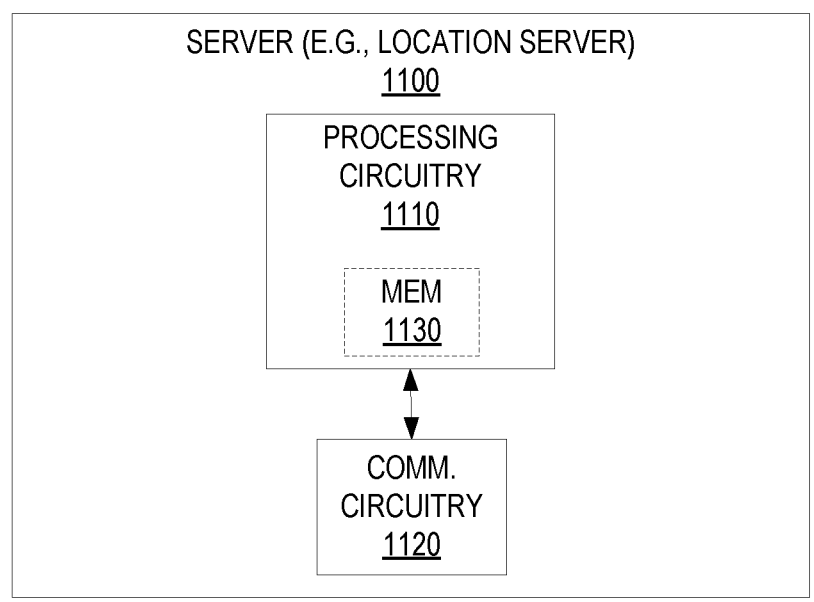
FIG. 11 is a block diagram of a server according to some embodiments.

FIG. 11 illustrates a server (e.g., a location server) (e.g., server 17) 1100 as implemented in accordance with one or more embodiments. As shown, the server 1100 includes processing circuitry 1110 and communication circuitry 1120. The communication circuitry 1120 is configured to transmit and/or receive information to and/or from one or more other nodes, e.g., via any communication technology. The processing circuitry 1110 is configured to perform processing described above, e.g., in FIGS. 5, 7, and/or 9, such as by executing instructions stored in memory 1130. The processing circuitry 1110 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. Some embodiments below in particular illustrate the above in a context where the mobile device 10 hosts a VAE client or an ITS client.

Both, short-range and long-range vehicle-to-everything (V2X) communication technology, can be used for Intelligent Transportation System (ITS) message dissemination. Owing to the limited communication range of short-range ad-hoc V2X communication technologies, e.g. ITS-G5/IEEE 802.11p or LTE-V2X PC5, only ITS stations, which are in the geographical vicinity of the transmitter, as limited by the direct radio communication range, can receive the ITS messages through single-hop communication. Multi-hop communication can enable larger areas but at the cost of higher delays and spectrum usage.

3GPP SA6 TR 23.275 V16.0.0 defines a V2X application enabler (VAE) function at the V2X application server (AS) and V2X user equipment (UE). The VAE is a middleware which relieves the application from several functions (e.g., location management, configuration management) and provides the interface to the network.

Figure 12:
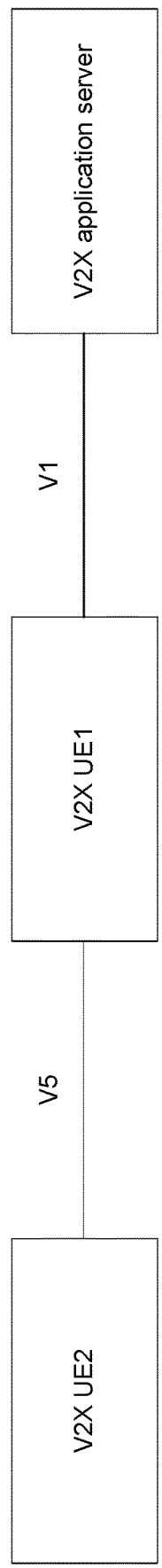
FIG. 12 is a block diagram of a simplified architectural model for the V2X application layer according to some embodiments.

FIG. 12 illustrates the simplified architectural model for the V2X application layer. It utilizes the architectural reference model specified in subclause 4.2 in 3GPP TS 23.285 V15.1.0, which has an impact on the application layer support aspects. As shown, the V2X UE1 communicates with V2X application server over the V1 reference point. The V2X UE1 and V2X UE2 communicate over the V5 reference point. V2X UE1 can also act as a UE-to-network relay, to enable V2X UE2 to access the V2X application server over V1 reference point.

The reference point V1 supports the V2X application related interactions between V2X UE and V2X AS and is specified in 3GPP TS 23.285 V15.1.0. This reference point is supported for both unicast and multicast delivery modes. The reference point V5 supports the interactions between the V2X UEs and is specified in 3GPP TS 23.285 V15.1.0.

Figure 13:
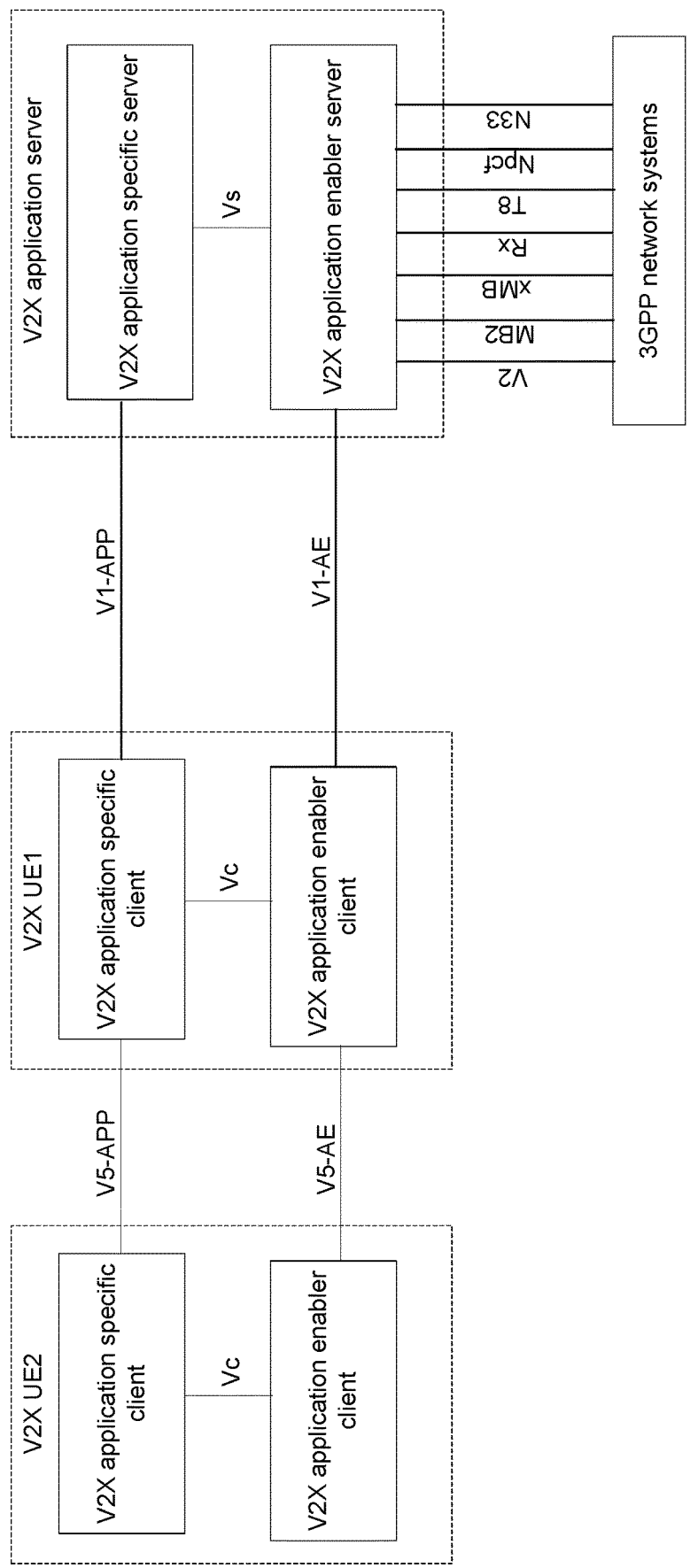
FIG. 13 is a block diagram of a detailed V2X application layer functional model according to some embodiments.

FIG. 13 illustrates the detailed V2X application layer functional model defined in TR 23.275 V16.0.0. It enhances the simplified architectural model for the V2X application layer by specifying the functional entities at the V2X application layer.

As shown, the V2X application server consists of V2X application enabler (VAE) server and the V2X application specific server. The VAE server provides the V2X application layer support functions to the V2X application specific server over Vs reference point.

The V2X UEs consist of the VAE client and the V2X application specific client. The VAE client provides the V2X application layer support functions to the V2X application specific client over Vc reference point.

The VAE client communicates with the VAE server over V1-AE reference point. The V2X application specific client communicates with V2X application specific server over V1-APP reference point.

Many solutions exist for geo-cast in cellular network. One solution is based on message queuing telemetry transport (MQTT). InterCor, Milestone 4—Common set of upgraded specifications for Hybrid communication", August 2018. Another solution is geo-location messaging (GLM). ETSI, TR 102 962 V1.1.1, Intelligent Transport Systems (ITS); Framework for Public Mobile Networks in Cooperative ITS (C-ITS), 02/2012. These solutions are formed based on concepts as follows. As potential receivers, ITS stations are aware of their geo-location and inform the central server or message broker about their location, when they first register at the central service or the message broker, or when their geo-location changes. The central server or message broker receives and maintains the geo-location information of the ITS stations. When an ITS message addresses ITS stations in a specific geographical area, the server or message broker sends the message to all stations in this geographical area according to the last obtained geo-location information of the ITS stations.

Note that the geo-location information can be geographic coordinate values, e.g. according to WGS84, or any tile/grid system that is mapped to the geographic coordinate system. Also note that an ITS station may explicitly inform the server about its current location, or inform the server about the tile or grid that it is currently located in. An alternative way for the ITS station to inform the server about its current location is to subscribe or register to groups or message queues organized and announced by the server, which are also associated to geographical areas, e.g. in MQTT (Message Queuing Telemetry Transport) based solution. Note further that the report of the geo-location information to the server can be triggered by the ITS station or by the server according to any predefined condition, e.g. after certain distance the ITS station has traveled or when the ITS station traverses the border of two tiles.

There currently exist certain challenge(s). Subscribing to a single geographical area at a time may result in suboptimal performance e.g., due to position inaccuracy, or when V2X users are interested in services that span multiple geographical area (e.g., 2 km hazard warning). When V2X users subscribe late to a new geographical area, this might result in service interruption.

3GPP TS 23.286 V0.1.0 states the V2X message distribution requirements for long-range cellular unicast communications as follows: (i) The VAE server shall provide a mechanism to distribute V2X messages to all registered receivers in targeted geographical areas; (ii) The VAE server shall enable the delivery of several V2X messages over the same connection; (iii) The VAE client shall have the capability to register to V2X messages within one geographical area; (iv) The VAE server shall have the capability to only forward V2X messages to authorized V2X UEs in target geographical areas; and (v) The VAE server shall provide a mechanism for priority support of different V2X messages (e.g. safety message).

Figure 14:
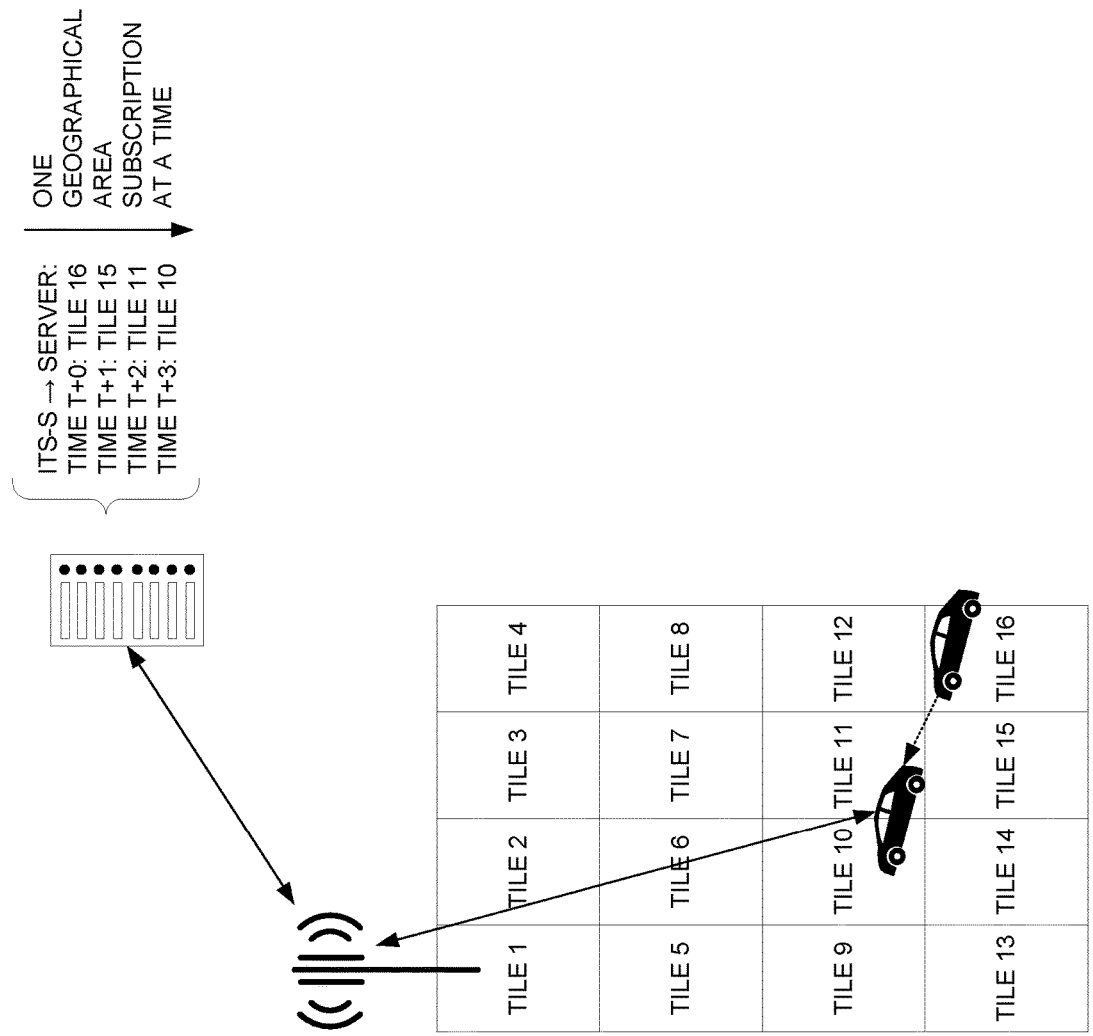
FIG. 14 is a block diagram of a V2X user being subscribed to one geographical area at a time.

FIG. 14 depicts a typical scenario where a V2X user is subscribed to one geographical area at a time according to these requirements.

However, a VAE client may suffer from inaccurate GPS positioning information and have difficulty in determining its accurate geolocation and the geographic area it actually belongs to. This issue happens more likely when the VAE client is located at the border of two or more geographic areas defined by the VAE server.

Certain aspects of the present disclosure and their embodiments may provide solutions to these or other challenges. According to some embodiments, an ITS/V2X user subscribes to multiple geographical areas at the same time. For example, in some embodiments, the ITS/V2X user might pre-subscribe to a new geographical area before reaching the new area and without unsubscribing from the current geographical area. In these and other embodiments, then, some embodiments provide a method to allow a V2X user or ITS station to subscribe simultaneously to multiple geographical areas, e.g., including pre-subscribing to new areas. As another example, in order to prevent missing any V2X message that is actually related to the VAE client, a VAE client simultaneously registers to all geographical areas that it may actually locate in, e.g., accounting for inaccurate GPS positioning information.

As another example, V2X applications may have Zones of Relevance (ZoR) of different sizes. ZoR is the geographical area that a V2X message is relevant. For example, the ZoR for Electronic Emergency Break Light (EEBL) warning or traffic Signal Phase and Timing (SPaT) application only covers several hundred meters, while applications like traffic jam ahead warning or lane closure warning may have a ZoR of up to several kilometers. At a given time, a V2X application client may be interested in multiple applications with different ZoR. According to some embodiments, then, the VAE client is able to simultaneously register to multiple geographical areas covered by the superset of different ZoR.

Moreover, allowing a VAE client to simultaneously register to multiple geographical areas helps protect the privacy of the user. Sharing geographic location information, which belongs to the private data of V2X UE, with the V2X application server may violate the privacy protection law GDPR in the UE and may enable potential tracking of the V2X UEs by the server. Through simultaneously registering to multiple geographical areas, the VAE client can reduce the probability of being tracked by the server.

Generally, then, some embodiments propose that a VAE client shall have the capability to register to V2X messages within one or more geographical areas.

In these and other cases, some embodiments allow the ITS/V2X User to (i) Exploit knowledge about known trajectory information to pre-subscribe to a new geographical area; (ii) Deal with position uncertainties when moving between different geographical area (e.g., at cross border, moving in and out of a geographical area); and/or (iii) Subscribe to receiving ITS services beyond its current geographical area while receiving continuing to receive services which correspond to its current area.

Certain embodiments may provide one or more of the following technical advantage(s). Subscribing to multiple geographical areas provides advantages to a ITS/V2X user, including one or more of the following: reduced service interruptions due to position inaccuracy, subscription to multi-zone services, and/or using look-ahead knowledge about trajectory to provide better services.

Figure 15:
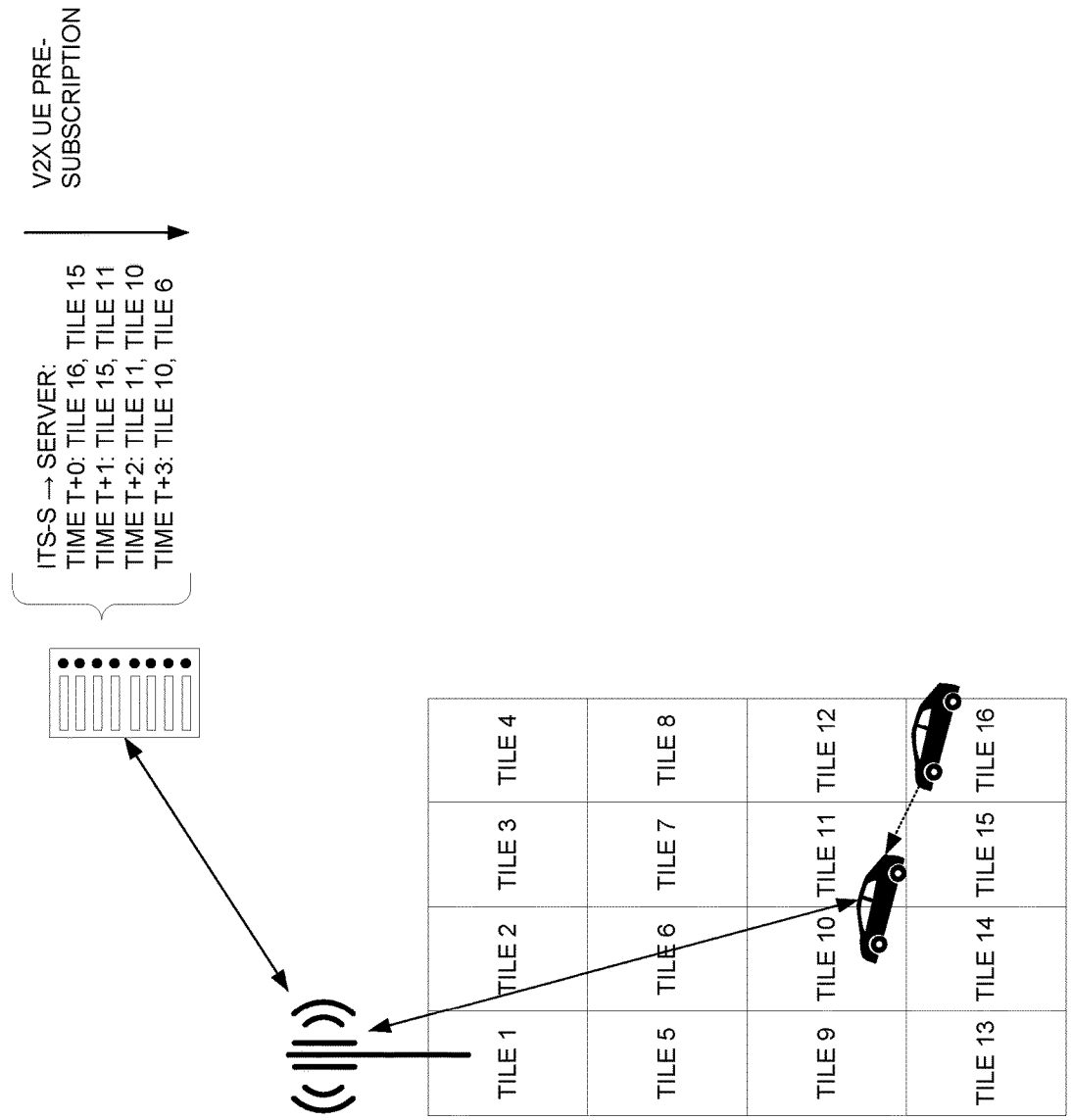
FIG. 15 is a block diagram of a V2X user being subscribed to multiple geographical areas at a time according to some embodiments.

FIG. 15 illustrates an example, contrasted with FIG. 14, in which a V2X UE subscribes to multiple geographical areas.

Some embodiments include a method that contains the following steps. In Step 1, the V2X user or ITS station reports multiple geographical locations (or subscribes to multiple geographical areas) to the server. This may include pre-subscribing to new geographical areas along the UE's path. In this case of the example in FIG. 15, this corresponds to subscription to tiles 16 (current) and 15 (pre-subscription) at time t+0, tiles 15 (current) and 11 (pre-subscription) at time t+1, tiles 11 (current) and 10 (pre-subscription) at time t+2, and tiles 10 (current) and 6 (pre-subscription) at time t+3.

In Step 2, the server receives the V2X user or ITS station subscriptions including pre-subscription to a new geographical area.

In Step 3, when an ITS/V2X message needs to be disseminated to any of the geo-locations or tiles that the ITS station or V2X user reported as its current location, the server transmits the ITS/V2X message to the ITS station or V2X user including the new pre-subscribed locations.

In Step 4, upon the reception of the ITS/V2X message, the ITS station or V2X user checks the target area and the intended service. If the ITS/V2X message is intended for its current target area and its current service, it decodes and processes the message. If the message is intended to a new pre-subscribed area, the V2X user or ITS station might discard the message or decode and process the message if the service in the new geographical area is of interest (e.g., hazard warning 2 kms ahead).

In Step 5, when moving to a new geographical area, the V2X user or ITS station directly utilizes the ITS/V2X messages delivered to that area as it has already pre-subscribed to this area and thus doesn't need to wait until it has subscribed to the new area.

In another embodiment, an ITS station or V2X user can pre-subscribe to more that one geographical location.

In some embodiments, the ITS station or V2X user might utilize known or predicted trajectory knowledge in order to pre-subscribe to new geographical area.

In some embodiments, the ITS station or V2X user might utilize knowledge about services in a new geographical area when subscribing to multiple geographical areas.

Some embodiments herein employ procedures that are the same as or derivatives of those described below for registration and de-registration.

Figure 16:
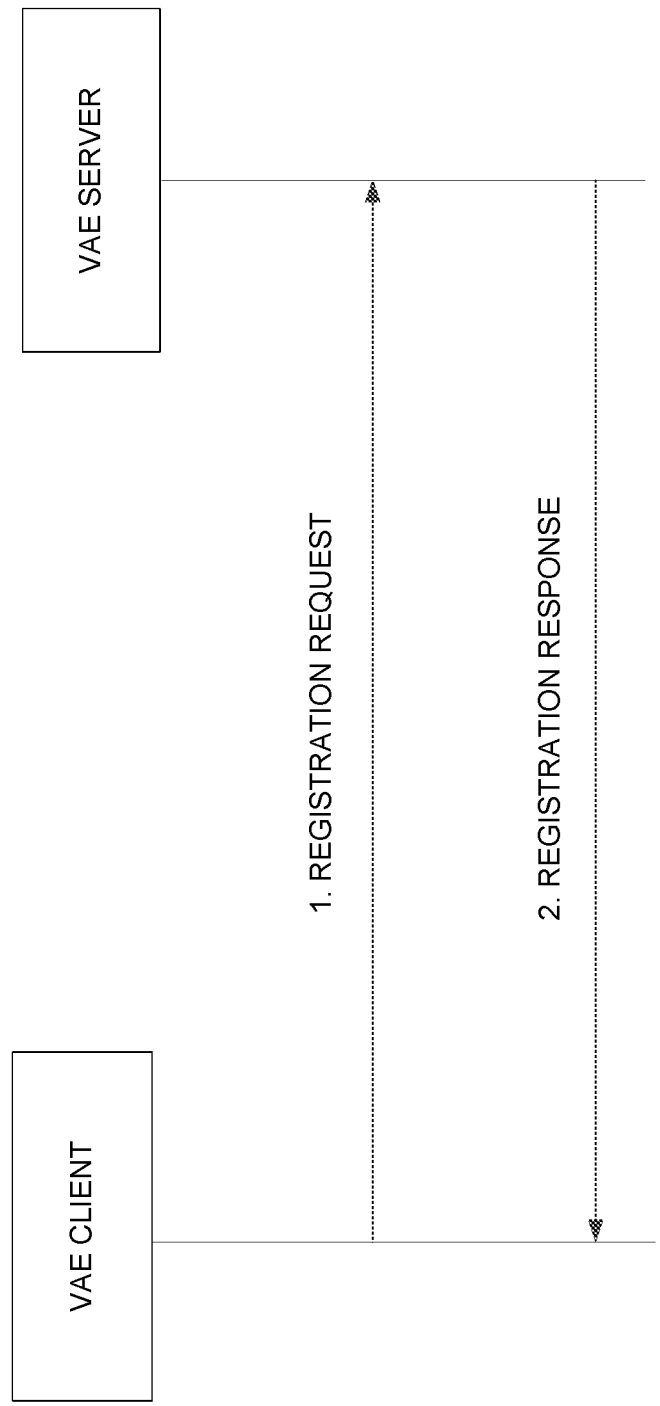
FIG. 16 is a call flow diagram of a procedure for registering the VAE client at the VAE server according to some embodiments.

Consider first procedures for V2X UE to register for receiving V2X messages from the V2X AS. The process is triggered by the V2X UE who is interested in receiving certain V2X messages. FIG. 16 show the procedure for registering the VAE client at the VAE server. In Step 1, the VAE client sends a registration request to the VAE server. The registration request includes a V2X UE ID information element that is an identifier of the V2X UE, e.g., StationID specified in ETSI TS 102 894-2. The registration request also includes a V2X MSG Type information element that indicates the V2X message types the V2X UE is interested in receiving, e.g., ETSI ITS DENM, ETSI ITS CAM.

In Step 2, the VAE server sends an acknowledgement to the VAE client. The acknowledgement is also referred to as a registration response. The registration response includes a Result information element that indicates the result from the VAE server in response to the registration request, indicating success or failure.

Figure 17:
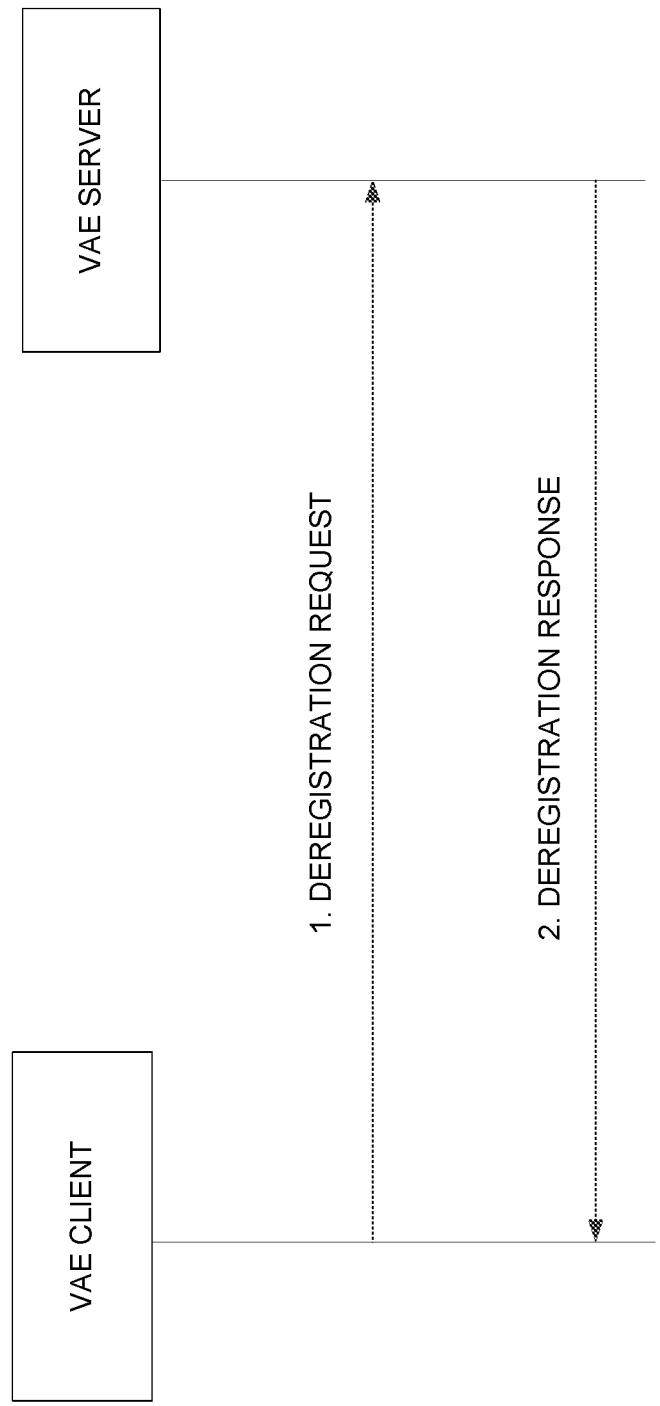
FIG. 17 is a call flow diagram of a procedure for deregistering the VAE client at the VAE server according to some embodiments.

Consider next procedures for V2X UE to deregister from receiving V2X messages from the V2X AS. The process is triggered by the V2X UE who is no longer interested in receiving certain V2X messages. FIG. 17 show the procedure for deregistering the VAE client at the VAE server. In Step 1, the VAE client sends a deregistration request to the VAE server. The deregistration request includes a V2X UE ID information element that is an identifier of the V2X UE. The deregistration request also includes a V2X MSG Type information element that indicates the V2X message types the V2X UE is no longer interested in receiving, e.g., ETSI ITS DENM, ETSI ITS CAM.

In Step 2, the VAE server sends a deregistration response to the VAE client. The deregistration response includes a Result information element that indicates the result from the VAE server in response to the deregistration request.

Consider now procedures for tracking V2X UEs geographical location at the VAE server. The V2X UE provides geographical area information to the VAE server upon moving to a new geographical area. This information is used by the VAE server to create and update the mapping between the geographical location and the identification of the V2X UE.

Figure 18:
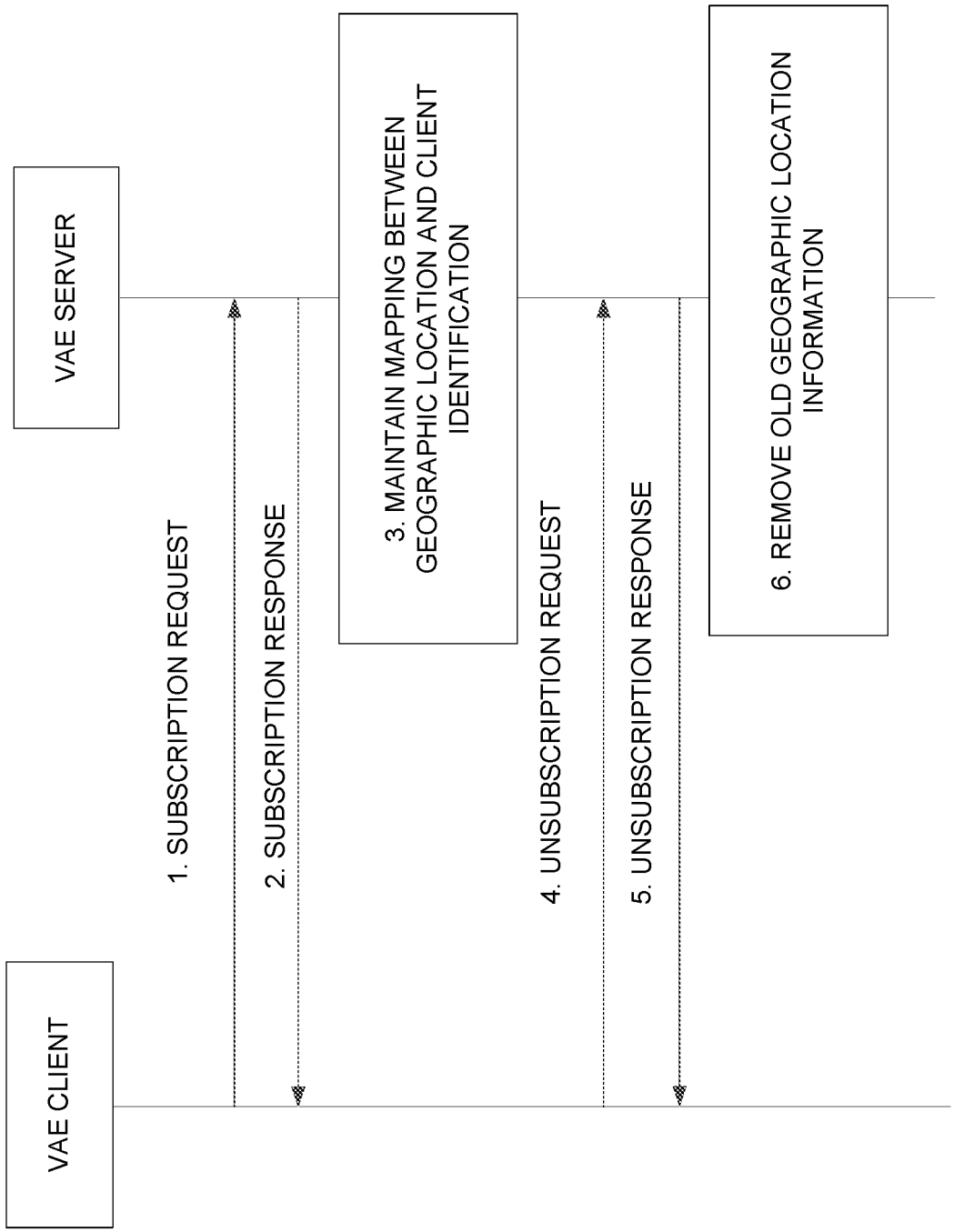
FIG. 18 is a call flow diagram of a procedure for tracking V2X UEs geographical location at the VAE server according to some embodiments.

FIG. 18 show the procedure for tracking V2X UEs geographical location at the VAE server. As pre-conditions for this procedure, the VAE client is provisioned with GEO ID information, the VAE client has registered with the VAE server as described above, and the VAE client has subscribed to a certain geographical area identifier group (GEO ID A) in order to receive V2X messages for this area. In Step 1 of the procedure, upon entering a new geographical area, the client subscribes to the geographic area Geo ID B. The client in this regard transmits a subscription request to the VAE server. The subscription request includes a V2X UE ID that is an identifier of the V2X UE, and a GEO ID that is a geographical area identifier, e.g. subscription URI, tile identifier, geo-fence tile identifier.

In Step 2, the VAE server sends a subscription response to the VAE client. The subscription response includes a Result information element that indicates the result from the VAE server in response to the subscription request, indicating success or failure.

In Step 3, the VAE server stores the new geographical area information GEO ID B with the client identification information V2X UE ID.

In Step 4, the client unsubscribes from the old geographical area GEO ID A. The unsubscription request includes a V2X UE ID that is an identifier of the V2X UE, and a GEO ID that is a geographical area identifier, e.g. subscription URI, tile identifier, geo-fence tile identifier.

In Step 5, the VAE server sends an unsubscription response to the VAE client. The unsubscription response includes a Result information element that indicates the result from the VAE server in response to the unsubscription request.

In Step 6, the VAE server removes the old geographical area information GEO ID A associated with the client identification information V2X UE ID.

Notably, though, according to some embodiments herein, Steps 4-6 are optional steps in the procedure. With these steps optional, the V2X UE may subscribe to the new geographical area GEO ID B without unsubscribing from the old geographical area GEO ID A.

Consider next a procedure for V2X message distribution, namely for message delivery to target geographical areas from the VAE server. That is, the procedure delivers V2X messages to registered V2X UEs at the VAE server in targeted geographical areas. As preconditions for the procedure, one or more VAE clients have registered with the VAE server, one or more VAE clients have subscribed to geographical area GEO ID, and the VAE server has created a mapping between geographical area information and client identification.

Figure 19:
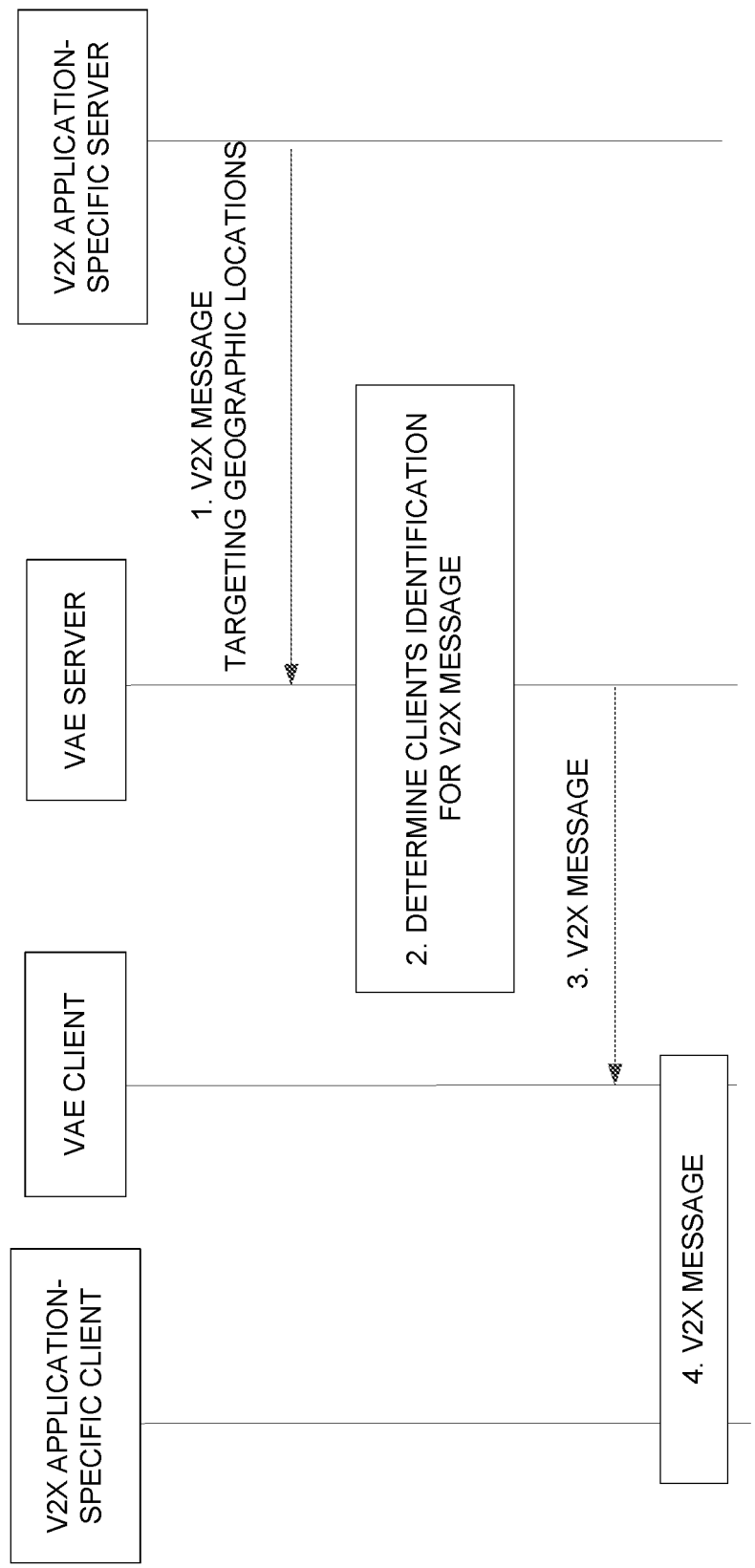
FIG. 19 is a call flow diagram of a procedure for V2X message distribution according to some embodiments.

As shown in FIG. 19, in Step 1, the application-specific server sends a V2X message V2X MSG ID (e.g. ETSI ITS DENM, ETSI ITS CAM) with target geographical area GEO ID. In Step 2, the VAE server retrieves the list of registered and subscribed clients for the V2X message targeting geographical area GEO ID and determines the clients' identification V2X UE ID. In Step 3, the VAE server transmits the message to each VAE client using the client identification. In Step 4, the VAE client provides the V2X message to the application-specific client.

Figure 20:
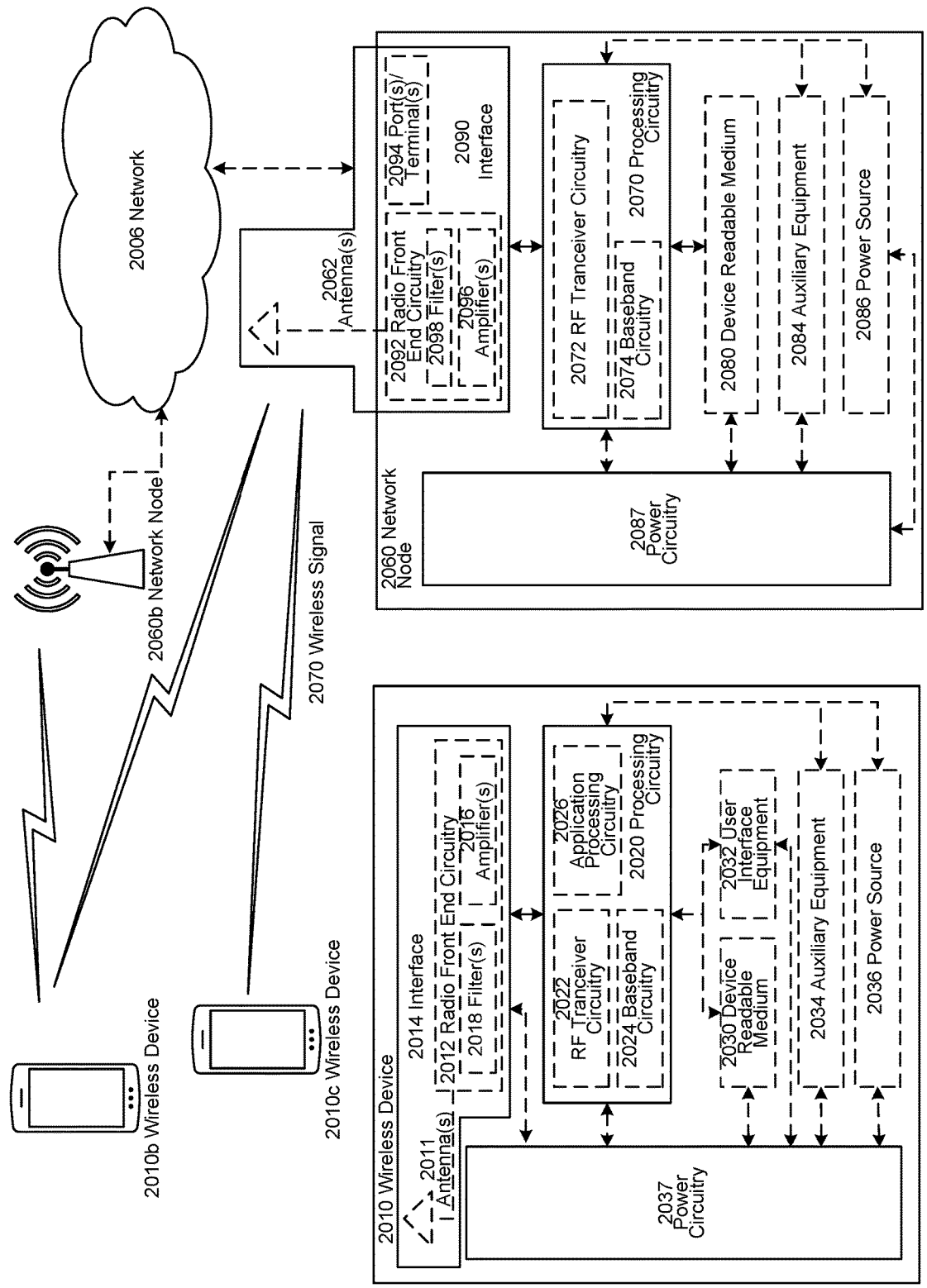
FIG. 20 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network 2006, network nodes 2060 and 2060b, and WDs 2010, 2010b, and 2010c. In practice, a wireless network may further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2060 are depicted as single boxes located within a larger box, or nested within multiple boxes, in practice, a network node may comprise multiple different physical components that make up a single illustrated component (e.g., device readable medium 2080 may comprise multiple separate hard drives as well as multiple RAM modules).

Similarly, network node 2060 may be composed of multiple physically separate components (e.g., a NodeB component and a RNC component, or a BTS component and a BSC component, etc.), which may each have their own respective components. In certain scenarios in which network node 2060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2060 may be configured to support multiple radio access technologies (RATs). In such embodiments, some components may be duplicated (e.g., separate device readable medium 2080 for the different RATs) and some components may be reused (e.g., the same antenna 2062 may be shared by the RATs). Network node 2060 may also include multiple sets of the various illustrated components for different wireless technologies integrated into network node 2060, such as, for example, GSM, WCDMA, LTE, NR, WiFi, or Bluetooth wireless technologies. These wireless technologies may be integrated into the same or different chip or set of chips and other components within network node 2060.

Processing circuitry 2070 is configured to perform any determining, calculating, or similar operations (e.g., certain obtaining operations) described herein as being provided by a network node. These operations performed by processing circuitry 2070 may include processing information obtained by processing circuitry 2070 by, for example, converting the obtained information into other information, comparing the obtained information or converted information to information stored in the network node, and/or performing one or more operations based on the obtained information or converted information, and as a result of said processing making a determination.

Processing circuitry 2070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2060 components, such as device readable medium 2080, network node 2060 functionality. For example, processing circuitry 2070 may execute instructions stored in device readable medium 2080 or in memory within processing circuitry 2070. Such functionality may include providing any of the various wireless features, functions, or benefits discussed herein. In some embodiments, processing circuitry 2070 may include a system on a chip (SOC).

In some embodiments, processing circuitry 2070 may include one or more of radio frequency (RF) transceiver circuitry 2072 and baseband processing circuitry 2074. In some embodiments, radio frequency (RF) transceiver circuitry 2072 and baseband processing circuitry 2074 may be on separate chips (or sets of chips), boards, or units, such as radio units and digital units. In alternative embodiments, part or all of RF transceiver circuitry 2072 and baseband processing circuitry 2074 may be on the same chip or set of chips, boards, or units In certain embodiments, some or all of the functionality described herein as being provided by a network node, base station, eNB or other such network device may be performed by processing circuitry 2070 executing instructions stored on device readable medium 2080 or memory within processing circuitry 2070. In alternative embodiments, some or all of the functionality may be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060, but are enjoyed by network node 2060 as a whole, and/or by end users and the wireless network generally.

Device readable medium 2080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2070. Device readable medium 2080 may store any suitable instructions, data or information, including a computer program, software, an application including one or more of logic, rules, code, tables, etc. and/or other instructions capable of being executed by processing circuitry 2070 and, utilized by network node 2060. Device readable medium 2080 may be used to store any calculations made by processing circuitry 2070 and/or any data received via interface 2090. In some embodiments, processing circuitry 2070 and device readable medium 2080 may be considered to be integrated.

Interface 2090 is used in the wired or wireless communication of signalling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that may be coupled to, or in certain embodiments a part of, antenna 2062. Radio front end circuitry 2092 comprises filters 2098 and amplifiers 2096. Radio front end circuitry 2092 may be connected to antenna 2062 and processing circuitry 2070. Radio front end circuitry may be configured to condition signals communicated between antenna 2062 and processing circuitry 2070. Radio front end circuitry 2092 may receive digital data that is to be sent out to other network nodes or WDs via a wireless connection. Radio front end circuitry 2092 may convert the digital data into a radio signal having the appropriate channel and bandwidth parameters using a combination of filters 2098 and/or amplifiers 2096. The radio signal may then be transmitted via antenna 2062. Similarly, when receiving data, antenna 2062 may collect radio signals which are then converted into digital data by radio front end circuitry 2092. The digital data may be passed to processing circuitry 2070. In other embodiments, the interface may comprise different components and/or different combinations of components.

In certain alternative embodiments, network node 2060 may not include separate radio front end circuitry 2092, instead, processing circuitry 2070 may comprise radio front end circuitry and may be connected to antenna 2062 without separate radio front end circuitry 2092. Similarly, in some embodiments, all or some of RF transceiver circuitry 2072 may be considered a part of interface 2090. In still other embodiments, interface 2090 may include one or more ports or terminals 2094, radio front end circuitry 2092, and RF transceiver circuitry 2072, as part of a radio unit (not shown), and interface 2090 may communicate with baseband processing circuitry 2074, which is part of a digital unit (not shown).

Antenna 2062 may include one or more antennas, or antenna arrays, configured to send and/or receive wireless signals. Antenna 2062 may be coupled to radio front end circuitry 2090 and may be any type of antenna capable of transmitting and receiving data and/or signals wirelessly. In some embodiments, antenna 2062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2062 may be separate from network node 2060 and may be connectable to network node 2060 through an interface or port.

Antenna 2062, interface 2090, and/or processing circuitry 2070 may be configured to perform any receiving operations and/or certain obtaining operations described herein as being performed by a network node. Any information, data and/or signals may be received from a wireless device, another network node and/or any other network equipment. Similarly, antenna 2062, interface 2090, and/or processing circuitry 2070 may be configured to perform any transmitting operations described herein as being performed by a network node. Any information, data and/or signals may be transmitted to a wireless device, another network node and/or any other network equipment.

Power circuitry 2087 may comprise, or be coupled to, power management circuitry and is configured to supply the components of network node 2060 with power for performing the functionality described herein. Power circuitry 2087 may receive power from power source 2086. Power source 2086 and/or power circuitry 2087 may be configured to provide power to the various components of network node 2060 in a form suitable for the respective components (e.g., at a voltage and current level needed for each respective component). Power source 2086 may either be included in, or external to, power circuitry 2087 and/or network node 2060. For example, network node 2060 may be connectable to an external power source (e.g., an electricity outlet) via an input circuitry or interface such as an electrical cable, whereby the external power source supplies power to power circuitry 2087. As a further example, power source 2086 may comprise a source of power in the form of a battery or battery pack which is connected to, or integrated in, power circuitry 2087. The battery may provide backup power should the external power source fail. Other types of power sources, such as photovoltaic devices, may also be used.

Alternative embodiments of network node 2060 may include additional components beyond those shown in FIG. 20 that may be responsible for providing certain aspects of the network node's functionality, including any of the functionality described herein and/or any functionality necessary to support the subject matter described herein. For example, network node 2060 may include user interface equipment to allow input of information into network node 2060 and to allow output of information from network node 2060. This may allow a user to perform diagnostic, maintenance, repair, and other administrative functions for network node 2060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE) and/or mobile device. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 may include multiple sets of one or more of the illustrated components for different wireless technologies supported by WD 2010, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2010.

Antenna 2011 may include one or more antennas or antenna arrays, configured to send and/or receive wireless signals, and is connected to interface 2014. In certain alternative embodiments, antenna 2011 may be separate from WD 2010 and be connectable to WD 2010 through an interface or port. Antenna 2011, interface 2014, and/or processing circuitry 2020 may be configured to perform any receiving or transmitting operations described herein as being performed by a WD. Any information, data and/or signals may be received from a network node and/or another WD. In some embodiments, radio front end circuitry and/or antenna 2011 may be considered an interface.

As illustrated, interface 2014 comprises radio front end circuitry 2012 and antenna 2011. Radio front end circuitry 2012 comprise one or more filters 2018 and amplifiers 2016. Radio front end circuitry 2014 is connected to antenna 2011 and processing circuitry 2020, and is configured to condition signals communicated between antenna 2011 and processing circuitry 2020. Radio front end circuitry 2012 may be coupled to or a part of antenna 2011. In some embodiments, WD 2010 may not include separate radio front end circuitry 2012; rather, processing circuitry 2020 may comprise radio front end circuitry and may be connected to antenna 2011. Similarly, in some embodiments, some or all of RF transceiver circuitry 2022 may be considered a part of interface 2014. Radio front end circuitry 2012 may receive digital data that is to be sent out to other network nodes or WDs via a wireless connection. Radio front end circuitry 2012 may convert the digital data into a radio signal having the appropriate channel and bandwidth parameters using a combination of filters 2018 and/or amplifiers 2016. The radio signal may then be transmitted via antenna 2011. Similarly, when receiving data, antenna 2011 may collect radio signals which are then converted into digital data by radio front end circuitry 2012. The digital data may be passed to processing circuitry 2020. In other embodiments, the interface may comprise different components and/or different combinations of components.

Processing circuitry 2020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2010 components, such as device readable medium 2030, WD 2010 functionality. Such functionality may include providing any of the various wireless features or benefits discussed herein. For example, processing circuitry 2020 may execute instructions stored in device readable medium 2030 or in memory within processing circuitry 2020 to provide the functionality disclosed herein.

As illustrated, processing circuitry 2020 includes one or more of RF transceiver circuitry 2022, baseband processing circuitry 2024, and application processing circuitry 2026. In other embodiments, the processing circuitry may comprise different components and/or different combinations of components. In certain embodiments processing circuitry 2020 of WD 2010 may comprise a SOC. In some embodiments, RF transceiver circuitry 2022, baseband processing circuitry 2024, and application processing circuitry 2026 may be on separate chips or sets of chips. In alternative embodiments, part or all of baseband processing circuitry 2024 and application processing circuitry 2026 may be combined into one chip or set of chips, and RF transceiver circuitry 2022 may be on a separate chip or set of chips. In still alternative embodiments, part or all of RF transceiver circuitry 2022 and baseband processing circuitry 2024 may be on the same chip or set of chips, and application processing circuitry 2026 may be on a separate chip or set of chips. In yet other alternative embodiments, part or all of RF transceiver circuitry 2022, baseband processing circuitry 2024, and application processing circuitry 2026 may be combined in the same chip or set of chips. In some embodiments, RF transceiver circuitry 2022 may be a part of interface 2014. RF transceiver circuitry 2022 may condition RF signals for processing circuitry 2020.

In certain embodiments, some or all of the functionality described herein as being performed by a WD may be provided by processing circuitry 2020 executing instructions stored on device readable medium 2030, which in certain embodiments may be a computer-readable storage medium. In alternative embodiments, some or all of the functionality may be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 may be configured to perform any determining, calculating, or similar operations (e.g., certain obtaining operations) described herein as being performed by a WD. These operations, as performed by processing circuitry 2020, may include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 may be operable to store a computer program, software, an application including one or more of logic, rules, code, tables, etc. and/or other instructions capable of being executed by processing circuitry 2020. Device readable medium 2030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2020. In some embodiments, processing circuitry 2020 and device readable medium 2030 may be considered to be integrated.

User interface equipment 2032 may provide components that allow for a human user to interact with WD 2010. Such interaction may be of many forms, such as visual, audial, tactile, etc. User interface equipment 2032 may be operable to produce output to the user and to allow the user to provide input to WD 2010. The type of interaction may vary depending on the type of user interface equipment 2032 installed in WD 2010. For example, if WD 2010 is a smart phone, the interaction may be via a touch screen; if WD 2010 is a smart meter, the interaction may be through a screen that provides usage (e.g., the number of gallons used) or a speaker that provides an audible alert (e.g., if smoke is detected). User interface equipment 2032 may include input interfaces, devices and circuits, and output interfaces, devices and circuits. User interface equipment 2032 is configured to allow input of information into WD 2010, and is connected to processing circuitry 2020 to allow processing circuitry 2020 to process the input information. User interface equipment 2032 may include, for example, a microphone, a proximity or other sensor, keys/buttons, a touch display, one or more cameras, a USB port, or other input circuitry. User interface equipment 2032 is also configured to allow output of information from WD 2010, and to allow processing circuitry 2020 to output information from WD 2010. User interface equipment 2032 may include, for example, a speaker, a display, vibrating circuitry, a USB port, a headphone interface, or other output circuitry. Using one or more input and output interfaces, devices, and circuits, of user interface equipment 2032, WD 2010 may communicate with end users and/or the wireless network, and allow them to benefit from the functionality described herein.

Auxiliary equipment 2034 is operable to provide more specific functionality which may not be generally performed by WDs. This may comprise specialized sensors for doing measurements for various purposes, interfaces for additional types of communication such as wired communications etc. The inclusion and type of components of auxiliary equipment 2034 may vary depending on the embodiment and/or scenario.

Power source 2036 may, in some embodiments, be in the form of a battery or battery pack. Other types of power sources, such as an external power source (e.g., an electricity outlet), photovoltaic devices or power cells, may also be used. WD 2010 may further comprise power circuitry 2037 for delivering power from power source 2036 to the various parts of WD 2010 which need power from power source 2036 to carry out any functionality described or indicated herein. Power circuitry 2037 may in certain embodiments comprise power management circuitry. Power circuitry 2037 may additionally or alternatively be operable to receive power from an external power source; in which case WD 2010 may be connectable to the external power source (such as an electricity outlet) via input circuitry or an interface such as an electrical power cable. Power circuitry 2037 may also in certain embodiments be operable to deliver power from an external power source to power source 2036. This may be, for example, for the charging of power source 2036. Power circuitry 2037 may perform any formatting, converting, or other modification to the power from power source 2036 to make the power suitable for the respective components of WD 2010 to which power is supplied.

Figure 21:
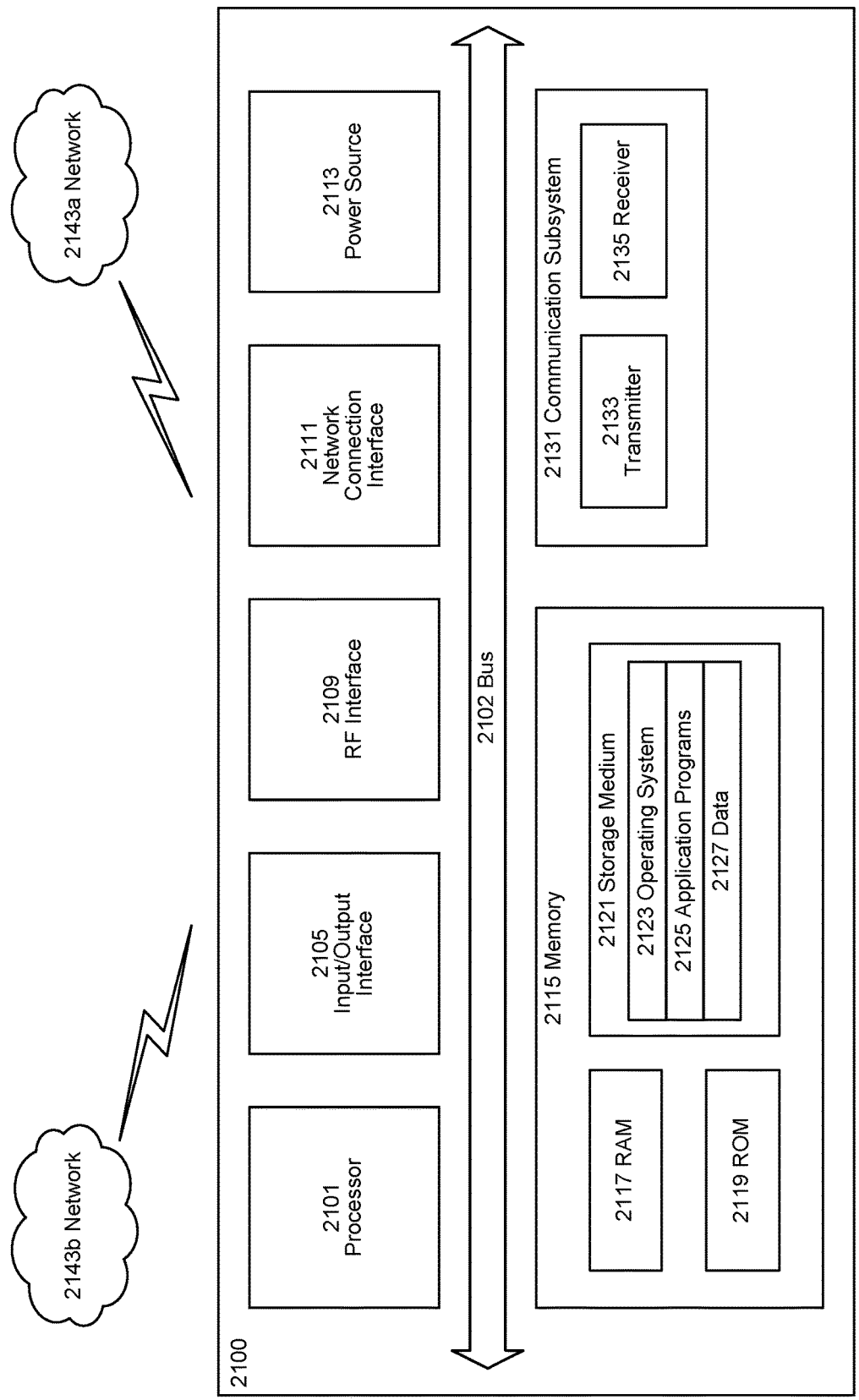
FIG. 21 is a block diagram of a user equipment according to some embodiments.

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 21200 may be any UE identified by the $3^{rd}$ Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2133, and/or any other component, or any combination thereof. Storage medium 2121 includes operating system 2123, application program 2125, and data 2127. In other embodiments, storage medium 2121 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 2101 may be configured to process computer instructions and data. Processing circuitry 2101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 may include two central processing units (CPUs). Data may be information in a form suitable for use by a computer.

In the depicted embodiment, input/output interface 2105 may be configured to provide a communication interface to an input device, output device, or input and output device. UE 2100 may be configured to use an output device via input/output interface 2105. An output device may use the same type of interface port as an input device. For example, a USB port may be used to provide input to and output from UE 2100. The output device may be a speaker, a sound card, a video card, a display, a monitor, a printer, an actuator, an emitter, a smartcard, another output device, or any combination thereof. UE 2100 may be configured to use an input device via input/output interface 2105 to allow a user to capture information into UE 2100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 2109 may be configured to provide a communication interface to RF components such as a transmitter, a receiver, and an antenna. Network connection interface 2111 may be configured to provide a communication interface to network 2143a. Network 2143a may encompass wired and/or wireless networks such as a local-area network (LAN), a wide-area network (WAN), a computer network, a wireless network, a telecommunications network, another like network or any combination thereof. For example, network 2143a may comprise a Wi-Fi network. Network connection interface 2111 may be configured to include a receiver and a transmitter interface used to communicate with one or more other devices over a communication network according to one or more communication protocols, such as Ethernet, TCP/IP, SONET, ATM, or the like. Network connection interface 2111 may implement receiver and transmitter functionality appropriate to the communication network links (e.g., optical, electrical, and the like). The transmitter and receiver functions may share circuit components, software or firmware, or alternatively may be implemented separately.

RAM 2117 may be configured to interface via bus 2102 to processing circuitry 2101 to provide storage or caching of data or computer instructions during the execution of software programs such as the operating system, application programs, and device drivers. ROM 2119 may be configured to provide computer instructions or data to processing circuitry 2101. For example, ROM 2119 may be configured to store invariant low-level system code or data for basic system functions such as basic input and output (I/O), startup, or reception of keystrokes from a keyboard that are stored in a non-volatile memory. Storage medium 2121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2121 may be configured to include operating system 2123, application program 2125 such as a web browser application, a widget or gadget engine or another application, and data file 2127. Storage medium 2121 may store, for use by UE 2100, any of a variety of various operating systems or combinations of operating systems.

Storage medium 2121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2121 may allow UE 2100 to access computer-executable instructions, application programs or the like, stored on transitory or non-transitory memory media, to off-load data, or to upload data. An article of manufacture, such as one utilizing a communication system may be tangibly embodied in storage medium 2121, which may comprise a device readable medium.

In FIG. 21, processing circuitry 2101 may be configured to communicate with network 2143b using communication subsystem 2131. Network 2143a and network 2143b may be the same network or networks or different network or networks. Communication subsystem 2131 may be configured to include one or more transceivers used to communicate with network 2143b. For example, communication subsystem 2131 may be configured to include one or more transceivers used to communicate with one or more remote transceivers of another device capable of wireless communication such as another WD, UE, or base station of a radio access network (RAN) according to one or more communication protocols, such as IEEE 802.21, CDMA, WCDMA, GSM, LTE, UTRAN, WiMax, or the like. Each transceiver may include transmitter 2133 and/or receiver 2135 to implement transmitter or receiver functionality, respectively, appropriate to the RAN links (e.g., frequency allocations and the like). Further, transmitter 2133 and receiver 2135 of each transceiver may share circuit components, software or firmware, or alternatively may be implemented separately.

In the illustrated embodiment, the communication functions of communication subsystem 2131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 may include cellular communication, Wi-Fi communication, Bluetooth communication, and GPS communication. Network 2143b may encompass wired and/or wireless networks such as a local-area network (LAN), a wide-area network (WAN), a computer network, a wireless network, a telecommunications network, another like network or any combination thereof. For example, network 2143b may be a cellular network, a Wi-Fi network, and/or a near-field network. Power source 2113 may be configured to provide alternating current (AC) or direct current (DC) power to components of UE 2100.

The features, benefits and/or functions described herein may be implemented in one of the components of UE 2100 or partitioned across multiple components of UE 2100. Further, the features, benefits, and/or functions described herein may be implemented in any combination of hardware, software or firmware. In one example, communication subsystem 2131 may be configured to include any of the components described herein. Further, processing circuitry 2101 may be configured to communicate with any of such components over bus 2102. In another example, any of such components may be represented by program instructions stored in memory that when executed by processing circuitry 2101 perform the corresponding functions described herein. In another example, the functionality of any of such components may be partitioned between processing circuitry 2101 and communication subsystem 2131. In another example, the non-computationally intensive functions of any of such components may be implemented in software or firmware and the computationally intensive functions may be implemented in hardware.

Figure 22:
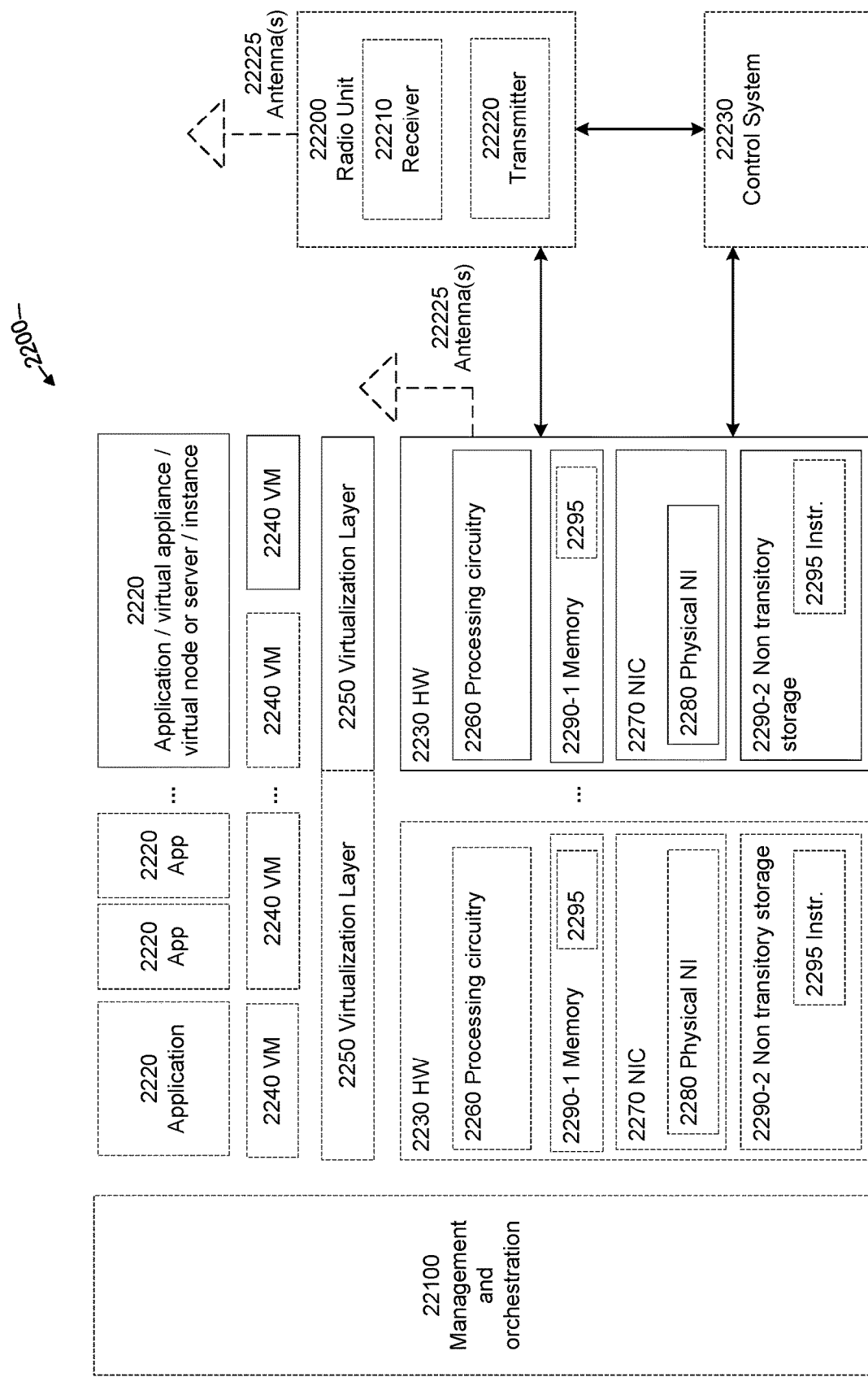
FIG. 22 is a block diagram of a virtualization environment according to some embodiments.

FIG. 22 is a schematic block diagram illustrating a virtualization environment 2200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node may be entirely virtualized.

The functions may be implemented by one or more applications 2220 (which may alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200, comprises general-purpose or special-purpose network hardware devices 2230 comprising a set of one or more processors or processing circuitry 2260, which may be commercial off-the-shelf (COTS) processors, dedicated Application Specific Integrated Circuits (ASICs), or any other type of processing circuitry including digital or analog hardware components or special purpose processors. Each hardware device may comprise memory 2290-1 which may be non-persistent memory for temporarily storing instructions 2295 or software executed by processing circuitry 2260. Each hardware device may comprise one or more network interface controllers (NICs) 2270, also known as network interface cards, which include physical network interface 2280. Each hardware device may also include non-transitory, persistent, machine-readable storage media 2290-2 having stored therein software 2295 and/or instructions executable by processing circuitry 2260. Software 2295 may include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240, comprise virtual processing, virtual memory, virtual networking or interface and virtual storage, and may be run by a corresponding virtualization layer 2250 or hypervisor. Different embodiments of the instance of virtual appliance 2220 may be implemented on one or more of virtual machines 2240, and the implementations may be made in different ways.

During operation, processing circuitry 2260 executes software 2295 to instantiate the hypervisor or virtualization layer 2250, which may sometimes be referred to as a virtual machine monitor (VMM). Virtualization layer 2250 may present a virtual operating platform that appears like networking hardware to virtual machine 2240.

As shown in FIG. 22, hardware 2230 may be a standalone network node with generic or specific components. Hardware 2230 may comprise antenna 22225 and may implement some functions via virtualization. Alternatively, hardware 2230 may be part of a larger cluster of hardware (e.g. such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2240 may be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22210 may be coupled to one or more antennas 22225. Radio units 22200 may communicate directly with hardware nodes 2230 via one or more appropriate network interfaces and may be used in combination with the virtual components to provide a virtual node with radio capabilities, such as a radio access node or a base station.

In some embodiments, some signalling can be effected with the use of control system 22230 which may alternatively be used for communication between the hardware nodes 2230 and radio units 22200.

Figure 23:
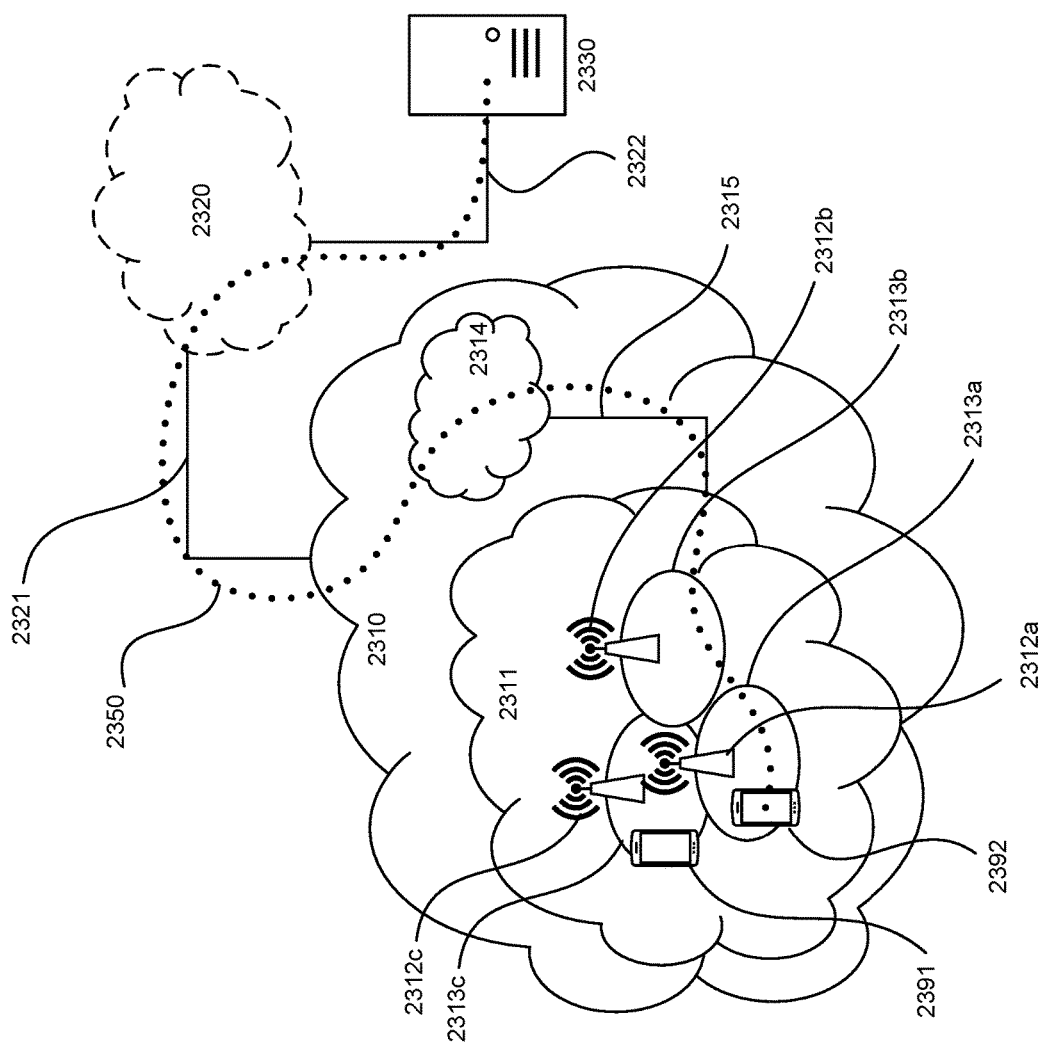
FIG. 23 is a block diagram of a communication network with a host computer according to some embodiments.

FIG. 23 illustrates a telecommunication network connected via an intermediate network to a host computer in accordance with some embodiments. In particular, with reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations 2312$a$, 2312$b$, 2312$c$, such as NBs, eNBs, gNBs or other types of wireless access points, each defining a corresponding coverage area 2313$a$, 2313$b$, 2313$c$. Each base station 2312$a$, 2312$b$, 2312$c$ is connectable to core network 2314 over a wired or wireless connection 2315. A first UE 2391 located in coverage area 2313$c$ is configured to wirelessly connect to, or be paged by, the corresponding base station 2312$c$. A second UE 2392 in coverage area 2313$a$ is wirelessly connectable to the corresponding base station 2312$a$. While a plurality of UEs 2391, 2392 are illustrated in this example, the disclosed embodiments are equally applicable to a situation where a sole UE is in the coverage area or where a sole UE is connecting to the corresponding base station 2312.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Figure 24:
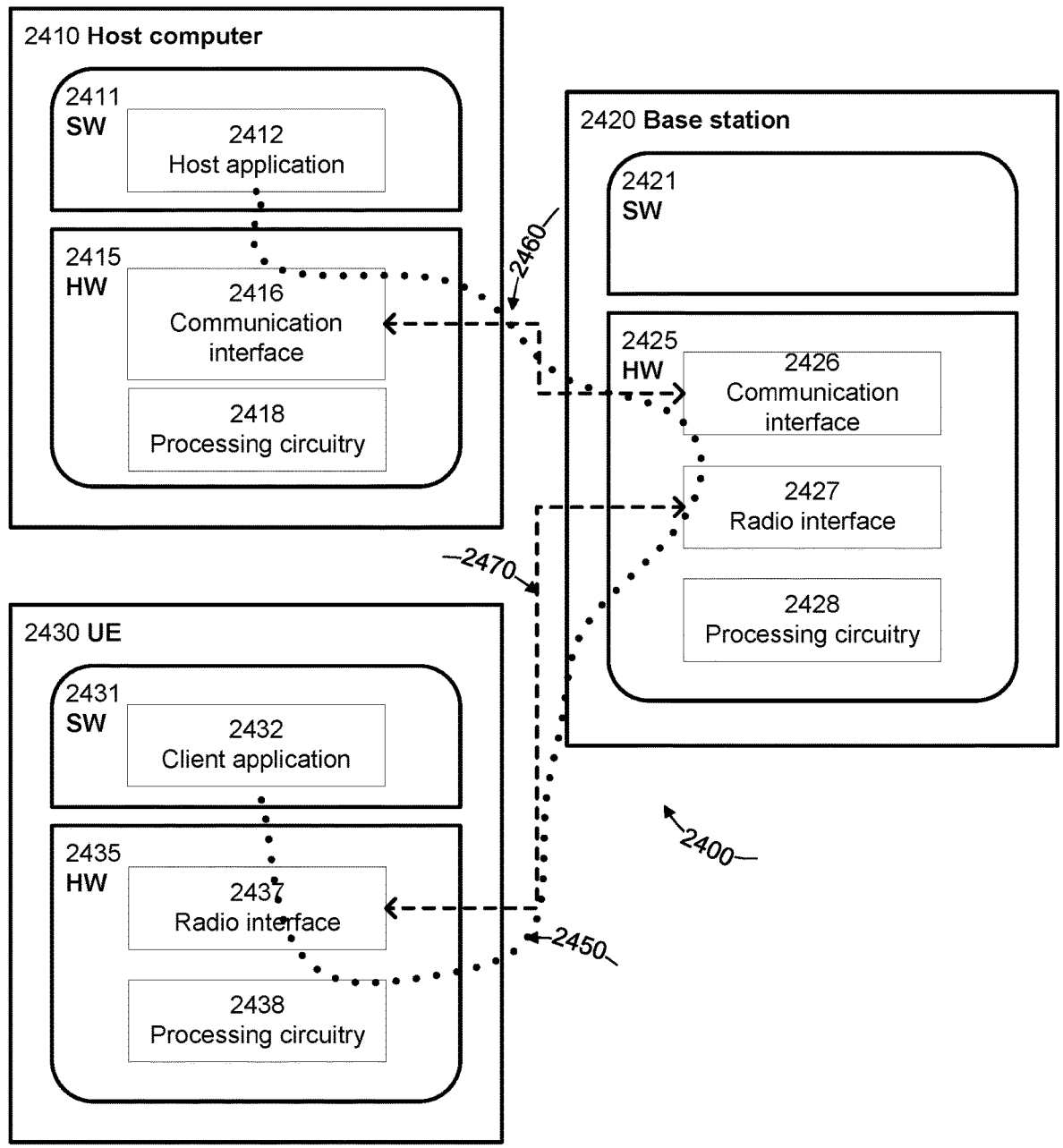
FIG. 24 is a block diagram of a host computer according to some embodiments.

Example implementations, in accordance with an embodiment, of the UE, base station and host computer discussed in the preceding paragraphs will now be described with reference to FIG. 24. FIG. 24 illustrates host computer communicating via a base station with a user equipment over a partially wireless connection in accordance with some embodiments In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312a, 2312b, 2312c and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the teachings of these embodiments may improve the service uptime, multi-zone service usage, and/or impact of positioning uncertainty/inaccuracy, and thereby provide benefits such as reduced user waiting time, better responsiveness, and improved service performance.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figure 25:
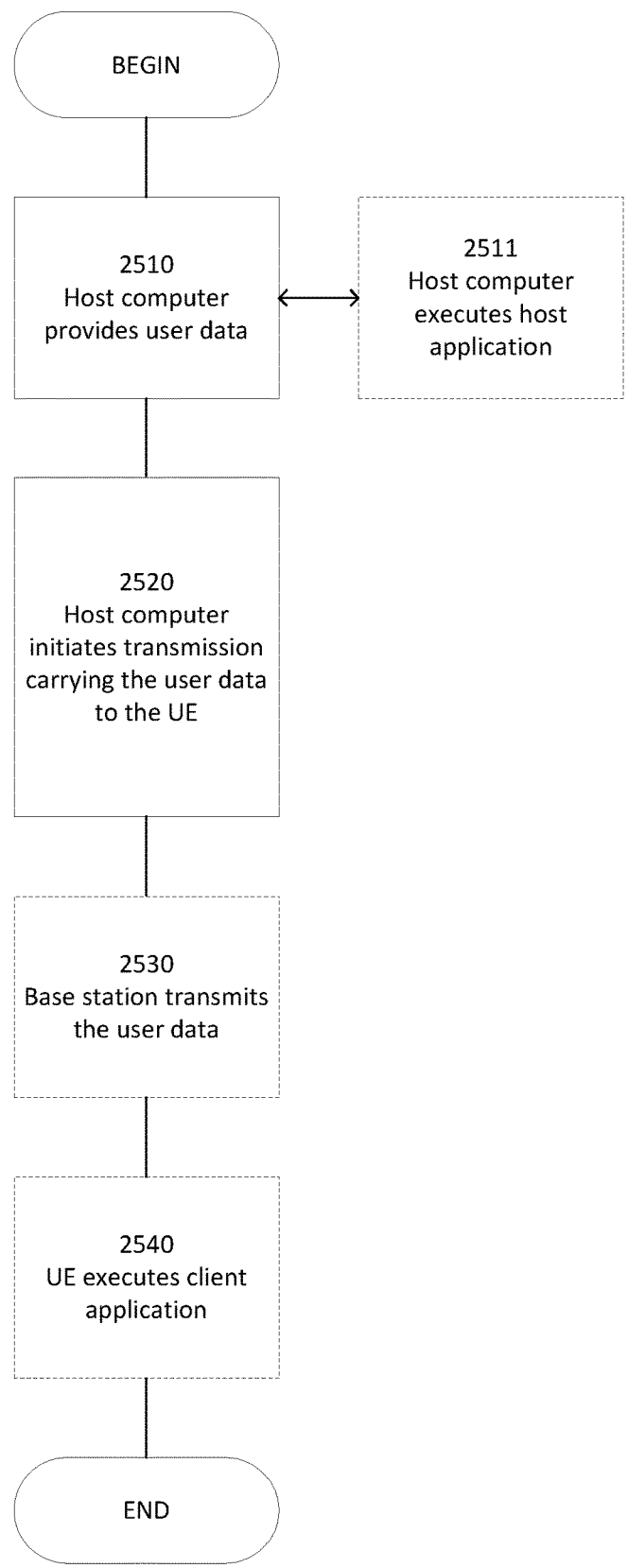
FIG. 25 is a flowchart illustrating a method implemented in a communication system, in accordance with one embodiment.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

Figure 26:
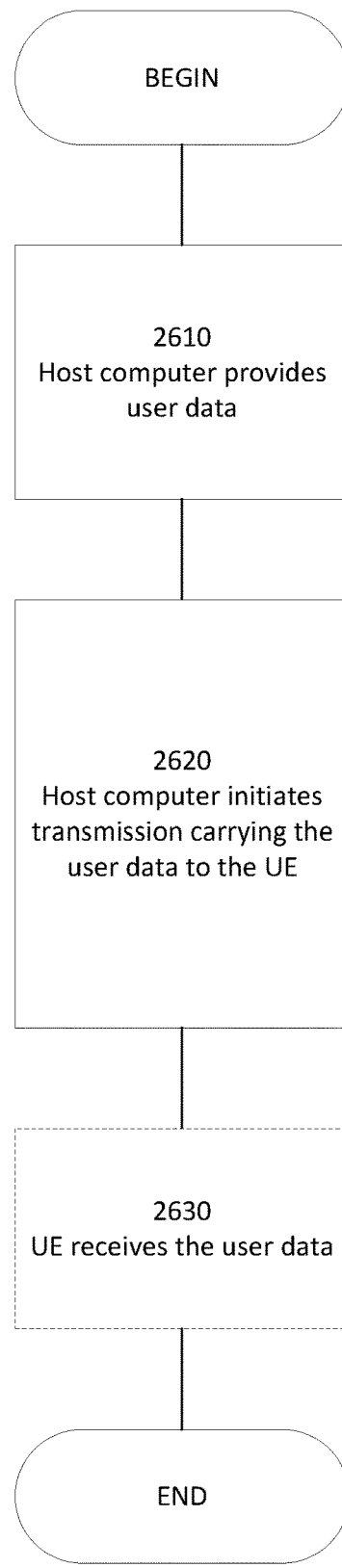
FIG. 26 is a flowchart illustrating a method implemented in a communication system, in accordance with one embodiment.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figure 27:
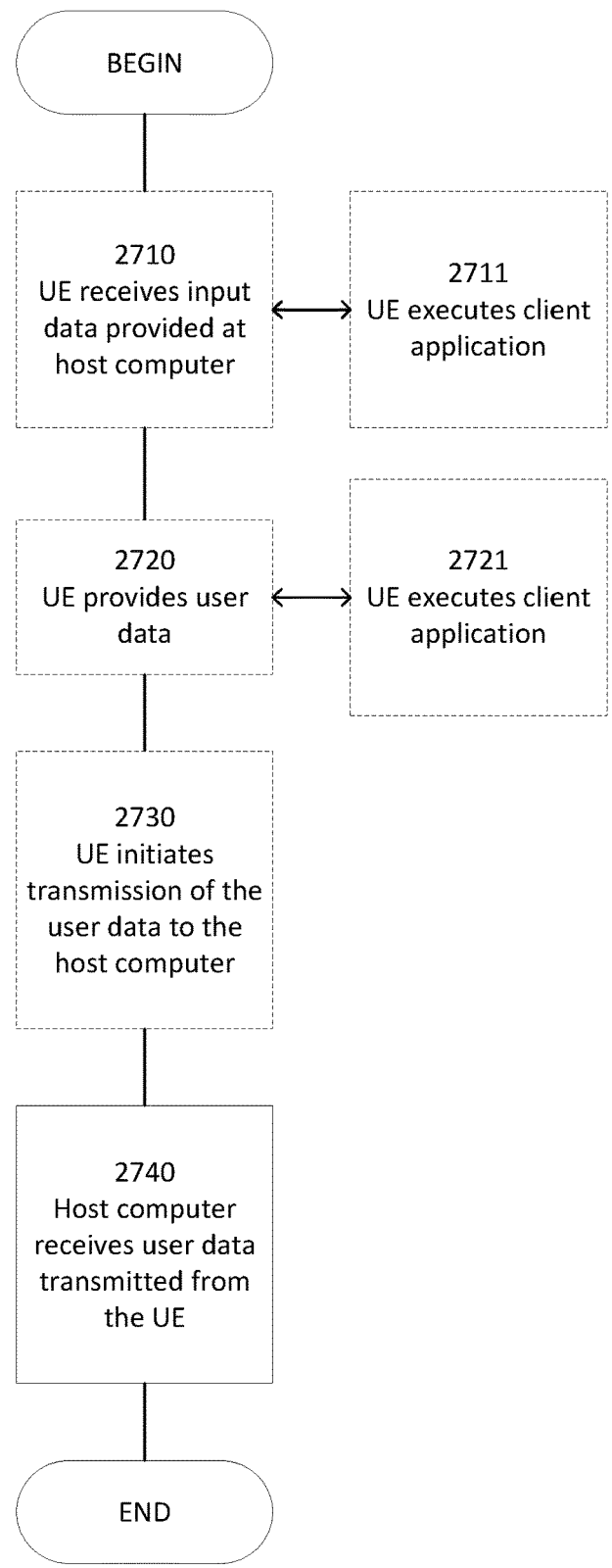
FIG. 27 is a flowchart illustrating a method implemented in a communication system, in accordance with one embodiment.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

Figure 28:
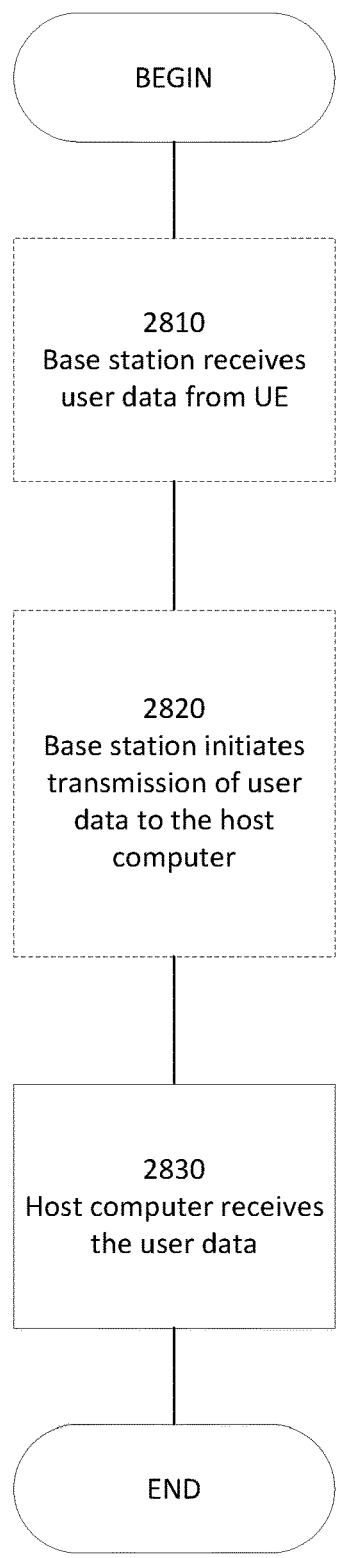
FIG. 28 is a flowchart illustrating a method implemented in a communication system, in accordance with one embodiment.

FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a mobile device that hosts a vehicle-to-everything (V2X) application enabler (VAE) client, the method comprising:
    subscribing the VAE client to receive, from a VAE server, V2X messages that are targeted to a first geographical area;
    subscribing the VAE client to receive, from the VAE server, V2X messages that are targeted to a second geographical area such that the VAE client hosted by the mobile device is simultaneously subscribed to receive V2X messages targeted to the first geographical area and to receive V2X messages targeted to the second geographical area;
    wherein subscribing to receive messages targeted to the first geographical area comprises transmitting, to the VAE server, a subscription request requesting that the VAE client be subscribed to receive messages targeted to the first geographical area; and
    wherein subscribing to receive messages targeted to the second geographical area comprises transmitting, to the VAE server, another subscription request requesting that the VAE client be subscribed to receive messages targeted to the second geographical area.

2. The method of claim 1, wherein subscribing the VAE client to receive V2X messages targeted to the second geographical area comprises, after subscribing the VAE client to receive V2X messages targeted to the first geographical area, subscribing the VAE client to receive V2X messages targeted to the second geographical area while remaining subscribed to receive V2X messages targeted to the first geographical area.

3. The method of claim 1, wherein the first subscription request includes a first geographical area identifier associated with the first geographical area, and wherein the second subscription request includes a second geographical area identifier associated with the second geographical area.

4. The method of claim 1, the method further comprises:
    refraining from transmitting, to the server an unsubscription request requesting that the mobile device be unsubscribed from receiving messages targeted to the first geographical area.

5. The method of claim 1, wherein the second geographical area is a geographical area that the mobile device is predicted to be within after the first geographical area, and wherein the method further comprises predicting, based on a trajectory of the mobile device, that the mobile device will be within the second geographical area after the first geographical area.

6. The method of claim 1, wherein the second geographical area is at least one of the following:
    a geographical area that is adjacent to the first geographical area,
    a geographical area within a zone of positioning uncertainty around the mobile device, and
    a geographical area that is included in a multi-area zone over which a service is provided.

7. The method of claim 1, wherein said subscribing to receive messages targeted to the second geographical area is performed when the mobile device is not within the second geographical area.

8. The method of claim 1, wherein the mobile device is simultaneously subscribed to receive messages from both the first and the second geographical areas when moving between the first and second geographical areas.

9. A method performed by a vehicle-to-everything (V2X) application enabler (VAE) server, the method comprising:
    tracking a location of a VAE client hosted by a mobile device on a geographical area by geographical area basis at an application layer;
    subscribing the VAE client of the mobile device to receive V2X messages targeted to a first geographical area at the application layer, responsive to receiving, from the VAE client, a subscription request requesting that the VAE client be subscribed to receive messages targeted to the first geographical area; and
    subscribing the VAE client of the mobile device to receive V2X messages targeted to a second geographical area at the application layer, such that the VAE client of the mobile device is simultaneously subscribed to receive V2X messages targeted to the first geographical area and to receive V2X messages targeted to the second geographical area, responsive to receiving, from the VAE client, another subscription request requesting that the VAE client be subscribed to receive messages targeted to the second geographical area.

10. The method of claim 9, wherein subscribing the VAE client of the mobile device to receive V2X messages targeted to the second geographical area comprises, after subscribing the VAE client of the mobile device to receive V2X messages targeted to the first geographical area, subscribing the VAE client of the mobile device to receive V2X messages targeted to the second geographical area while the VAE client of the mobile device remains subscribed to receive V2X messages targeted to the first geographical area.

11. The method of claim 9, wherein the first subscription request includes a first geographical area identifier associated with the first geographical area, and wherein the second subscription request includes a second geographical area identifier associated with the second geographical area.

12. A mobile device configured to host a vehicle-to-everything (V2X) application enabler (VAE) client at an application layer, the mobile device comprising:
    communication circuitry; and
    processing circuitry configured to:
        subscribe the VAE client to receive, from a VAE server that tracks a location of the VAE client on a geographical area by geographical area basis at the application layer, V2X messages that are targeted to a first geographical area at the application layer, wherein the processing circuitry is configured to subscribe to receive messages targeted to the first geographical area by transmitting, to the VAE server, a subscription request requesting that the VAE client be subscribed to receive messages targeted to the first geographical area; and subscribe the VAE client to receive, from the VAE server, V2X messages that are targeted to a second geographical area at the application layer such that the VAE client hosted by the mobile device is simultaneously subscribed to receive V2X messages targeted to the first geographical area and to receive V2X messages targeted to the second geographical area, wherein the processing circuitry is configured to subscribe to receive messages targeted to the second geographical area by transmitting, to the VAE server, another subscription request requesting that the VAE client be subscribed to receive messages targeted to the second geographical area.

13. The mobile device of claim 12, wherein the processing circuitry is configured to subscribe the VAE client to receive V2X messages targeted to the second geographical area by, after subscribing the VAE client to receive V2X messages targeted to the first geographical area, subscribing the VAE client to receive V2X messages targeted to the second geographical area while remaining subscribed to receive V2X messages targeted to the first geographical area.

14. The mobile device of claim 12, wherein the first subscription request includes a first geographical area identifier group associated with the first geographical area, and wherein the second subscription request includes a second geographical area identifier group associated with the second geographical area.

15. The mobile device of claim 12, wherein the processing circuitry is further configured to refrain from transmitting to the server an unsubscription request requesting that the mobile device be unsubscribed from receiving messages targeted to the first geographical area.

16. The mobile device of claim 12, wherein the second geographical area is a geographical area that the mobile device is predicted to be within after the first geographical area, and wherein the processing circuitry is further configured to predict, based on a trajectory of the mobile device, that the mobile device will be within the second geographical area after the first geographical area.

17. The mobile device of claim 12, wherein the second geographical area is at least one of the following:

a geographical area that is adjacent to the first geographical area, a geographical area within a zone of positioning uncertainty around the mobile device, and a geographical area that is included in a multi-area zone over which a service is provided.

18. The mobile device of claim 12, wherein the processing circuitry is configured to subscribe to receive messages targeted to the second geographical area when the mobile device is not within the second geographical area.

19. The mobile device of claim 12, wherein the mobile device is simultaneously subscribed to receive messages from both the first and the second geographical areas when moving between the first and second geographical areas.

20. The mobile device of claim 12, wherein the mobile device is a vehicle.

21. A vehicle-to-everything (V2X) application enabler (VAE) server comprising:
communication circuitry; and
processing circuitry configured to:
track a location of a VAE client hosted by a mobile device on a geographical area by geographical area basis at an application layer;
subscribe the VAE client of the mobile device to receive V2X messages targeted to a first geographical area at the application layer, responsive to receiving, from the VAE client, a subscription request requesting that the VAE client be subscribed to receive messages targeted to the first geographical area; and
subscribe the VAE client of the mobile device to receive V2X messages targeted to a second geographical area at the application layer such that the VAE client of the mobile device is simultaneously subscribed to receive V2X messages targeted to the first geographical area and to receive V2X messages targeted to the second geographical area, responsive to receiving, from the VAE client, another subscription request requesting that the VAE client be subscribed to receive messages targeted to the second geographical area.

22. The VAE server of claim 21, wherein the processing circuitry is configured to subscribe the VAE client of the mobile device to receive V2X messages targeted to the second geographical area by, after subscribing the VAE client of the mobile device to receive V2X messages targeted to the first geographical area, subscribing the VAE client of the mobile device to receive V2X messages targeted to the second geographical area while the VAE client of the mobile device remains subscribed to receive V2X messages targeted to the first geographical area.

23. The VAE server of claim 21, wherein a grid at the application layer comprises multiple tiles, and wherein the first and second geographical areas are first and second tiles in the grid.

24. The VAE server of claim 21, wherein the processing circuitry is configured to:
subscribe the VAE client of the mobile device to receive V2X messages targeted to the first geographical area by receiving, from the VAE client of the mobile device, a first subscription request requesting that the VAE client of the mobile device be subscribed to receive V2X messages targeted to the first geographical area, and subscribing the VAE client of the mobile device to receive V2X messages targeted to the first geographical area in response to the first subscription request; and
subscribe the VAE client of the mobile device to receive V2X messages targeted to the second geographical area by performing a procedure, wherein performing the procedure comprises:
receiving, from the VAE client of the mobile device, as part of the procedure, a second subscription request requesting that the VAE client of the mobile device be subscribed to receive V2X messages targeted to the second geographical area; and
subscribing the VAE client of the mobile device to receive V2X messages targeted to the second geographical area in response to the second subscription request.

25. The VAE server of claim 24, wherein the first subscription request includes a first geographical area identifier group associated with the first geographical area, and wherein the second subscription request includes a second geographical area identifier group associated with the second geographical area.

26. A non-transitory computer-readable medium on which is stored a computer program comprising instructions which, when executed by at least one processor of a mobile device that hosts a vehicle-to-everything (V2X) application enabler (VAE) client at an application layer, causes the mobile device to:

subscribe the VAE client to receive, from a VAE server that tracks a location of the VAE client on a geographical area by geographical area basis at the application layer, V2X messages that are targeted to a first geographical area at the application layer, by transmitting, to the VAE server, a subscription request requesting that the VAE client be subscribed to receive messages targeted to the first geographical area; and subscribe the VAE client to receive, from the VAE server, V2X messages that are targeted to a second geographical area at the application layer such that the VAE client hosted by the mobile device is simultaneously subscribed to receive V2X messages targeted to the first geographical area and to receive V2X messages targeted to the second geographical area, by transmitting, to the VAE server, another subscription request requesting that the VAE client be subscribed to receive messages targeted to the second geographical area.

27. A non-transitory computer-readable medium on which is stored a computer program comprising instructions which, when executed by at least one processor of a vehicle-to-everything (V2X) application enabler (VAE) server, causes the VAE server to:

track a location of a VAE client hosted by a mobile device on a geographical area by geographical area basis at an application layer;

subscribe the VAE client of the mobile device to receive V2X messages targeted to a first geographical area at the application layer, responsive to receiving, from the VAE client, a subscription request requesting that the VAE client be subscribed to receive messages targeted to the first geographical area; and subscribe the VAE client of the mobile device to receive V2X messages targeted to a second geographical area at the application layer such that the VAE client of the mobile device is simultaneously subscribed to receive V2X messages targeted to the first geographical area and to receive V2X messages targeted to the second geographical area, responsive to receiving, from the VAE client, another subscription request requesting that the VAE client be subscribed to receive messages targeted to the second geographical area.

* * * * *

UNITED STATES PATENT AND TRADEMARK OFFICE
CERTIFICATE OF CORRECTION

| | | |
|---|---|---|
| PATENT NO. | : 12,133,143 B2 | Page 1 of 3 |
| APPLICATION NO. | : 18/089791 | |
| DATED | : October 29, 2024 | |
| INVENTOR(S) | : El Essaili et al. | |

It is certified that error appears in the above-identified patent and that said Letters Patent is hereby corrected as shown below:

In the Drawings

In Fig. 6, Sheet 7 of 28, delete Tag "W330" and insert Tag -- 630 --, therefor.

In Fig. 20, Sheet 20 of 28, for Tag "2072", in Line 1, delete "Tranceiver" and insert -- Transceiver --, therefor.

In Fig. 20, Sheet 20 of 28, for "Tag 2022", in Line 1, delete "Tranceiver" and insert -- Transceiver --, therefor.

In the Specification

In Column 4, Lines 14-15, delete "a first subscription request" and insert -- a subscription request --, therefor.

In Column 4, Lines 18-19, delete "the first subscription request." and insert -- the subscription request. --, therefor.

In Column 4, Lines 23-24, delete "a second subscription request" and insert -- another subscription request --, therefor.

In Column 4, Lines 28-29, delete "the second subscription request." and insert -- the another subscription request. --, therefor.

In Column 4, Line 46, delete "request" and insert -- request. --, therefor.

In Column 6, Line 56, delete "(PC's)" and insert -- (PCIs) --, therefor.

In Column 20, Line 38, delete "clident" and insert -- client --, therefor.

Signed and Sealed this
Twelfth Day of August, 2025

Coke Morgan Stewart
*Acting Director of the United States Patent and Trademark Office*

CERTIFICATE OF CORRECTION (continued)
U.S. Pat. No. 12,133,143 B2

In Column 21, Line 35, delete "that" and insert -- than --, therefor.

In Column 21, Line 47, delete "who" and insert -- which --, therefor.

In Column 21, Line 65, delete "who" and insert -- which --, therefor.

In Column 21, Line 66, delete "show" and insert -- shows --, therefor.

In Column 22, Line 20, delete "show" and insert -- shows --, therefor.

In Column 25, Line 53, delete "units" and insert -- units. --, therefor.

In Column 26, Line 67, delete "circuitry 2090" and insert -- circuitry 2092 --, therefor.

In Column 28, Line 16, delete "(CPE). a" and insert -- (CPE), a --, therefor.

In Column 29, Line 4, delete "Radio front end circuitry 2014" and insert -- Radio front end circuitry 2012 --, therefor.

In Column 31, Line 48, delete "UE 21200" and insert -- UE 2100 --, therefor.

In Column 31, Line 57, delete "interchangeable." and insert -- interchangeably. --, therefor.

In Column 31, Line 66, delete "power source 2133," and insert -- power source 2113, --, therefor.

In Column 35, Line 3, delete "2290. Memory 2290" and insert -- 2290-1. Memory 2290-1 --, therefor.

In Column 37, Line 19, delete "embodiments" and insert -- embodiments. --, therefor.

In Column 39, Line 66, delete "substep 2730" and insert -- step 2730 --, therefor.

In Column 40, Line 39, delete "according" and insert -- according to --, therefor.

In the Claims

In Column 43, Lines 54-55, in Claim 3, delete "the first subscription request" and insert -- the subscription request --, therefor.

In Column 43, Lines 56-57, in Claim 3, delete "the second subscription request" and insert -- the another subscription request --, therefor.

In Column 44, Lines 51-52, in Claim 11, delete "the first subscription request" and insert -- the subscription request --, therefor.

CERTIFICATE OF CORRECTION (continued)
U.S. Pat. No. 12,133,143 B2

In Column 44, Lines 53-54, in Claim 11, delete "the second subscription request" and insert -- the another subscription request --, therefor.

In Column 45, Lines 28-29, in Claim 14, delete "the first subscription request" and insert -- the subscription request --, therefor.

In Column 45, Line 31, in Claim 14, delete "the second subscription request" and insert -- the another subscription request --, therefor.

In Column 46, Lines 45-46, in Claim 24, delete "a first subscription request" and insert -- the subscription request --, therefor.

In Column 46, Line 51, in Claim 24, delete "the first subscription request;" and insert -- the subscription request; --, therefor.

In Column 46, Line 57, in Claim 24, delete "a second subscription request" and insert -- the another subscription request --, therefor.

In Column 46, Lines 63-64, in Claim 24, delete "the second subscription request." and insert -- the another subscription request. --, therefor.

In Column 46, Lines 65-66, in Claim 25, delete "the first subscription request" and insert -- the subscription request --, therefor.

In Column 47, Line 1, in Claim 25, delete "the second subscription request" and insert -- the another subscription request --, therefor.